US011995708B2

United States Patent
Rosenbaum

(10) Patent No.: US 11,995,708 B2
(45) Date of Patent: May 28, 2024

(54) SYSTEMS, METHODS, COMPUTING PLATFORMS, AND STORAGE MEDIA FOR GENERATING AND OPTIMIZING VIRTUAL STOREFRONT TEMPLATES

(71) Applicant: Sunlytix, LLC, Denver, CO (US)

(72) Inventor: Austin Louis Drake Rosenbaum, Denver, CO (US)

(73) Assignee: Demand IQ, Inc., Denver, CO (US)

( * ) Notice: Subject to any disclaimer, the term of this patent is extended or adjusted under 35 U.S.C. 154(b) by 192 days.

(21) Appl. No.: 17/347,227

(22) Filed: Jun. 14, 2021

(65) Prior Publication Data

US 2022/0398650 A1     Dec. 15, 2022

(51) Int. Cl.
*G06Q 30/0601*   (2023.01)
*G06Q 30/0201*   (2023.01)
(Continued)

(52) U.S. Cl.
CPC ..... *G06Q 30/0643* (2013.01); *G06Q 30/0201* (2013.01); *G06Q 30/0603* (2013.01);
(Continued)

(58) Field of Classification Search
CPC ........ G06Q 30/01; G06Q 30/015–016; G06Q 30/0201–0205; G06Q 30/0278; G06Q 30/0283; G06Q 30/06–0643; G06Q 30/08; G06Q 40/03; G06Q 50/06; G06Q 50/08; G06Q 50/16; G06Q 50/163; Y02E 10/50;
(Continued)

(56) References Cited

U.S. PATENT DOCUMENTS 10,311,529 B1 *   6/2019   Noel ................... G06Q 30/0611
10,534,851 B1 *   1/2020   Chan ................... G06Q 30/0255
(Continued)

FOREIGN PATENT DOCUMENTS

WO   WO-2021046638 A1 *   3/2021   ............. G06F 17/00

OTHER PUBLICATIONS

IQ interactive launches iQ toolkit. M2 Presswire. Nov. 6, 2013. (Year: 2013).*

(Continued)

*Primary Examiner* — William J Allen
(74) *Attorney, Agent, or Firm* — Neugeboren O'Dowd PC

(57) ABSTRACT

Systems, methods, computing platforms, and storage media for generating and optimizing virtual storefront templates are disclosed. Exemplary implementations may: receive, from an administrator device, a first set of inputs; generate a first virtual storefront template based on the first set of inputs; access, from a user device, a first virtual storefront user interface (UI), the first virtual storefront UI capable of being accessed to obtain product recommendations, sales proposals, and/or quotes; receive a request comprising a location and product preferences from a user device; determine site specific information based on the request; identify one or more products for recommendation based on the site specific information; display at least one of a product recommendation and a quote for at least one product; obtain one or more first performance results specific to the first virtual storefront template; and modify at least a portion of the first virtual storefront template.

18 Claims, 22 Drawing Sheets

(51) Int. Cl.
  *G06Q 40/03* (2023.01)
  *G06Q 30/0242* (2023.01)

(52) U.S. Cl.
  CPC ..... *G06Q 30/0611* (2013.01); *G06Q 30/0623* (2013.01); *G06Q 30/0631* (2013.01); *G06Q 30/0633* (2013.01); *G06Q 40/03* (2023.01); *G06Q 30/0242* (2013.01)

(58) Field of Classification Search
  CPC ........ Y02E 40/70; Y02P 60/12; Y02P 20/133; Y02P 80/20; Y02P 60/14; Y02B 10/10; Y02B 10/20
  See application file for complete search history.

(56) References Cited

U.S. PATENT DOCUMENTS

| | | | | |
|---|---|---|---|---|
| 11,100,554 | B1* | 8/2021 | Gupta | G06Q 30/0641 |
| 2005/0246627 | A1* | 11/2005 | Sayed | G06Q 30/0605 |
| | | | | 715/234 |
| 2009/0304227 | A1* | 12/2009 | Kennedy | G06V 20/13 |
| | | | | 702/155 |
| 2012/0265695 | A1* | 10/2012 | Tuchman | G06Q 10/02 |
| | | | | 705/304 |
| 2015/0066442 | A1* | 3/2015 | Pryor | G06Q 50/16 |
| | | | | 136/251 |
| 2015/0363874 | A1* | 12/2015 | Wallander | G06Q 40/03 |
| | | | | 705/38 |
| 2017/0076304 | A1 | 3/2017 | Toth et al. | |
| 2018/0204280 | A1* | 7/2018 | Painter | G06Q 40/08 |
| 2018/0293640 | A1* | 10/2018 | Krappé | H04L 51/02 |
| 2019/0325464 | A1* | 10/2019 | Wood | G06Q 30/0203 |
| 2021/0264071 | A1 | 8/2021 | Vratimos et al. | |

OTHER PUBLICATIONS

Roadster, "Roadster", Known to exist as early as Oct. 1, 2021, Publisher: Downloaded from hhttps://roadster.com/ on Oct. 5, 2021.

\* cited by examiner

SYSTEMS, METHODS, COMPUTING PLATFORMS, AND STORAGE MEDIA FOR GENERATING AND OPTIMIZING VIRTUAL STOREFRONT TEMPLATES

FIELD OF THE DISCLOSURE

The present disclosure relates to systems, methods, computing platforms, and storage media for optimizing virtual storefront templates.

BACKGROUND

E-commerce, online sales of goods and services, has had profound cost reduction benefits for numerous economic sectors. However, there have been several industry verticals that have been left behind. In general, the underlying reason that some market sub-segments have yet to "digitize" their sales practices is that their products are typically very complex and highly customized to each buyer's preferences. Thus, these products have traditionally relied on a "high-touch" sales process predicated on substantial human involvement. This is one reason that this segment of industries often carry higher price tags in comparison to other businesses that sell goods online with significantly less human intervention. Examples of these industries include home improvements such as roofing, solar panel installation, driveway installation, automotive, lawn care, insurance, and home mortgage financing, among others.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. As used herein, the terms "virtual storefront", "virtual storefront UI", "storefront UI", and "storefront" may be used interchangeably and may refer to a user interface accessed by a customer (e.g., a homeowner). Further, the terms "virtual storefront template" and "storefront template" may be used interchangeably and may refer to a template for generating virtual storefronts or storefront UIs. In some cases, a virtual storefront template may dictate the layout, look, feel, and/or presentation of data for one or more virtual storefronts. In some aspects, a virtual storefront template may serve as the structure or parent of the virtual storefront UI. In some cases, a virtual storefront UI may be associated with a single virtual storefront template. However, a virtual storefront template may be associated with one or more virtual storefront UIs. In some cases, two or more virtual storefront templates may be compared, for instance, based on the performance results of two or more virtual storefronts (or storefront UIs), where at least one virtual storefront UI may be generated using one of the two or more virtual storefront templates, and another virtual storefront UI may be generated using another of the two or more virtual storefront templates.

As described above, certain industries, such as re-roofing, solar panel installation, lawn care, etc., have been slow to move their presence online and digitize their sales practices. For instance, the products or services provided by these industries are often times hard to quote without an in-depth understanding of the customer's preferences and situation. In some cases, a large amount of data may be shared with the product provider (or contractor) to tailor a quote for the buyer's consideration. In some cases, the product provider may even have to make a physical visit to the customer's location to take measurements or evaluate site conditions. Recent advancements in satellite and aerial imagery and analysis have facilitated in lowering the amount of data that needs be shared with contractors. Further, physical on-site visits by contractors may not always be required with access to satellite and aerial imagery. In some circumstances, contractors may lack the knowledge and skills to develop robust digital ecosystems that can help enhance their businesses sales via the internet. In some cases, there may be a significant knowledge gap between industries (e.g., online retail) that have moved to online sales and those that have not. Further, as consumer preferences shift increasingly to lower touch and online sales, some industries, such as home improvement industries, may struggle unless they convert to sales practices online.

One aspect of the present disclosure relates to a system configured for generating and optimizing virtual storefront templates, the system comprising one or more hardware processors configured by machine-readable instructions to receive, from an administrator device, a first set of inputs, wherein the administrator device is associated with a contractor; generate a first virtual storefront template based at least in part on the first set of inputs; access, from a user device, a first virtual storefront user interface (UI) generated from the first virtual storefront template, the first virtual storefront UI capable of being accessed to obtain product recommendations, quotes, sales proposals, or a combination thereof; receive, from the user device, a request, wherein the request comprises a location and one or more product preferences, and wherein at least one of the one or more product preferences comprises one or more of a project budget, a cost or system offset (e.g., in solar panel projects, at least a portion of future utility bills may be replaced by the cost of the project); determine site specific information based at least in part on the request, the site specific information comprising one or more of geospatial data, site measurement data, weather data, and solar irradiance data; identify one or more products for recommendation based on the site specific information; display at least one of a product recommendation, a sales proposal, and a quote for at least one product of the one or more products via the first virtual storefront UI accessed from the user device; obtain one or more first performance results, the one or more first performance results specific to the first virtual storefront template; and modify at least a portion of the first virtual storefront template based on the one or more first performance results.

Another aspect of the present disclosure relates to a method for generating and optimizing virtual storefront templates, the method comprising receiving, from an administrator device, a first set of inputs, wherein the administrator device is associated with a contractor; generating a first virtual storefront template based at least in part on the first set of inputs; accessing, from a user device, a first virtual storefront user interface (UI) generated from the first virtual storefront template, the first virtual storefront UI capable of being accessed to obtain product recommendations, sales proposals, quotes, or a combination thereof; receiving, from the user device, a request, wherein the request comprises a location and one or more product preferences, and wherein at least one of the one or more product preferences comprises one or more of a project budget and a cost/system offset (e.g., in solar panel projects, at least a portion of future utility bills may be replaced by the cost of the project); determining site specific information based at least in part on the request, the site specific information comprising one or more of geospatial data, weather data, site measurement data, and solar irradiance data; identifying one or more products for recommendation based on the site specific information; displaying at least one of a product recommendation, a sales proposal, and a quote for at least one product of the one or more products via the first virtual storefront UI accessed from the user device; obtaining one or more first performance results, the one or more first performance results specific to the first virtual storefront template; and modifying at least a portion of the persisting virtual storefront template based on the one or more first performance results.

Yet another aspect of the present disclosure relates to a computing platform configured for generating and optimizing virtual storefront templates. The computing platform may include a non-transient computer-readable storage medium having executable instructions embodied thereon. The computing platform may include one or more hardware processors configured to execute the instructions. The processor(s) may execute the instructions to receive, from an administrator device, a first set of inputs, wherein the administrator device is associated with a contractor; generate a first virtual storefront template based at least in part on the first set of inputs; access, from a user device, a first virtual storefront user interface (UI) generated from the first virtual storefront template, the first virtual storefront UI capable of being accessed to obtain product recommendations, sales proposals, quotes, or a combination thereof; receive, from the user device, a request, wherein the request comprises a location and one or more product preferences, and wherein at least one of the one or more product preferences comprises one or more of a project budget and a cost/system offset (e.g., in solar panel projects, at least a portion of future utility bills may be replaced by the cost of the project); determine site specific information based at least in part on the request, the site specific information comprising one or more of geospatial data, site measurement data, weather data, and solar irradiance data; identify one or more products for recommendation based on the site specific information; display at least one of a product recommendation, a sales proposal, and a quote for at least one product of the one or more products via the first virtual storefront UI accessed from the user device; obtain one or more first performance results, the one or more first performance results specific to the first virtual storefront template; and modify at least a portion of the first virtual storefront template based on the one or more first performance results.

Even another aspect of the present disclosure relates to a non-transient computer-readable storage medium having instructions embodied thereon, the instructions being executable by one or more processors to perform a method for generating and optimizing virtual storefront templates, the method comprising receiving, from an administrator device, a first set of inputs, wherein the administrator device is associated with a contractor; generating a first virtual storefront template based at least in part on the first set of inputs; accessing, from a user device, a first virtual storefront user interface (UI) generated from the first virtual storefront template, the first virtual storefront UI capable of being accessed to obtain product recommendations, sales proposals, quotes, or a combination thereof; receiving, from the user device, a request, wherein the request comprises a location and one or more product preferences, and wherein at least one of the one or more product preferences comprises one or more of a project budget and a cost/system offset (e.g., in solar panel projects, at least a portion of future utility bills may be replaced by the cost of the project); determining site specific information based at least in part on the request, the site specific information comprising one or more of geospatial data, weather data, site measurement data, and solar irradiance data; identifying one or more products for recommendation based on the site specific information; displaying at least one of a product recommendation and a quote for at least one product of the one or more products via the first virtual storefront UI accessed from the user device; obtaining one or more first performance results, the one or more first performance results specific to the first virtual storefront template; and modifying at least a portion of the first virtual storefront template based on the one or more first performance results.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
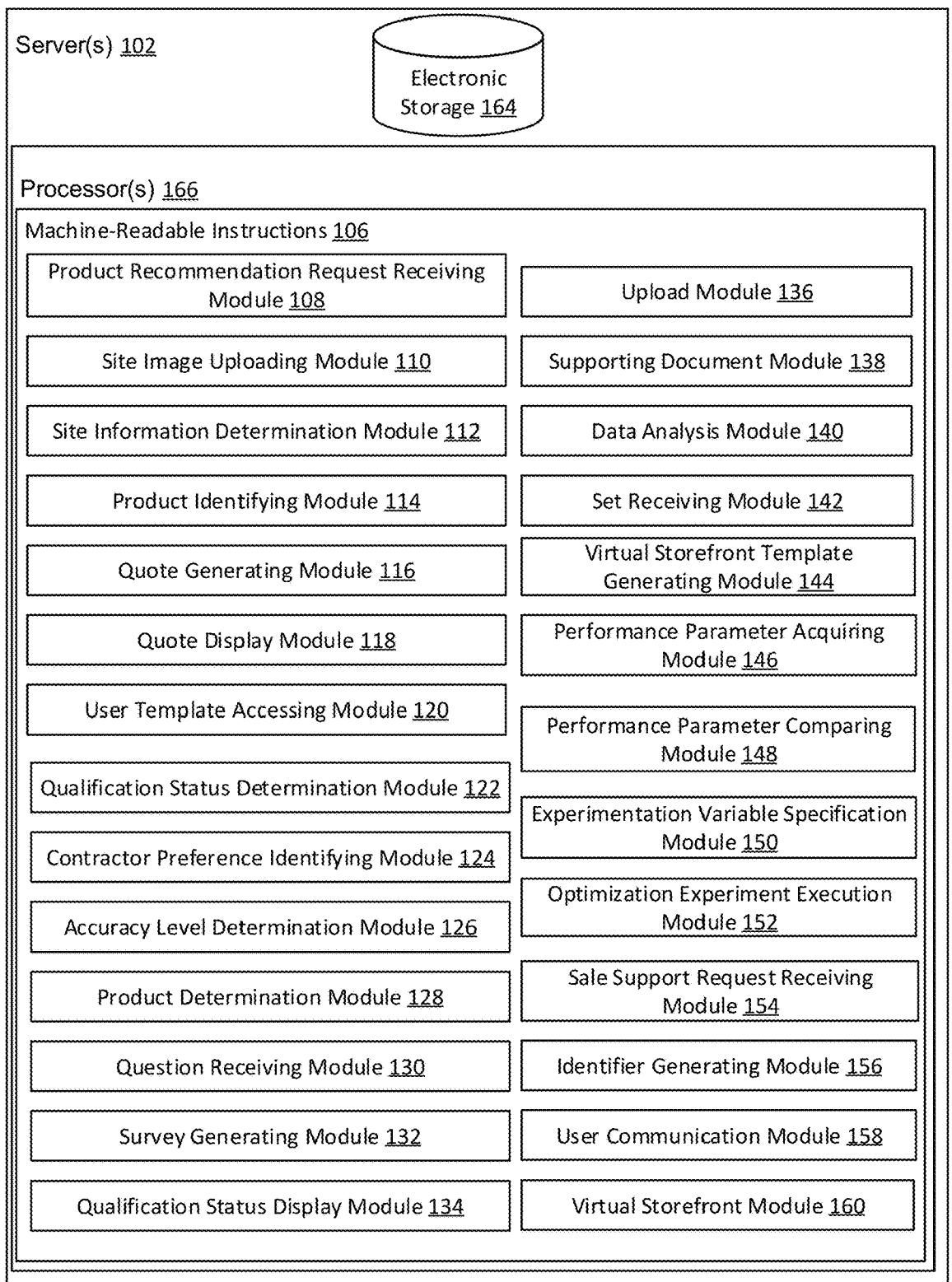
FIG. 1 illustrates a system configured for optimizing customer acquisition, in accordance with one or more implementations.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In some cases, aspects of the present disclosure relate to providing customers with a templatized online sales experience by creating one or more virtual storefronts (or storefront UIs). In some cases, high-ticket offline sales industries (e.g., solar panel installation, lawn care, re-roofing) may deploy their business online via the use of virtual storefronts. As used herein, a virtual storefront system (e.g., system 100 in FIG. 1; server 315 and virtual storefront module 330 in FIG. 3; virtual storefront module 630 in FIG. 6) may comprise one or more engines, such as a storefront optimization/testing engine (also referred to as an experiments module), a billing engine, a customer qualification engine, a live support matching engine, a contract and payment engine, and optionally a product recommendation and quoting engine, further described in relation to the figures below. In some cases, the product recommendation and quoting engine may or may not be a part of the virtual storefront system. For instance, the product recommendation and quoting engine may be associated with a third party system that provides product recommendations and/quotes. In either case, the product recommendation and quoting engine may be in communication (e.g., via an Application Programming Interface (API)) with the virtual storefront system over a network (e.g., wired or wireless network). In some examples, the virtual storefront system (e.g., virtual storefront module 630 in FIG. 6) may be configured to receive data from one or more databases or datastores, such as a lender criteria database, a portal configuration database, a contractor preferences database, a virtual storefront templates database, an experimentation parameters database, a geospatial and weather data database, and a market data database, further described below in relation to at least FIG. 6. In some embodiments, there may be a single virtual storefront system or module associated with multiple contractors (or product providers, service providers).

In some cases, multiple contractors or service providers may utilize the virtual storefront system of the present disclosure for selling their products and/or services, customer retention, and providing customer service, to name a few non-limiting examples. For the purposes of this disclosure, a contractor or service provider may interact with the virtual storefront system via a contractor user interface (UI), where the contractor UI forms a part of the business-to-business (B2B) side of the system (e.g., system 300 in FIG. 3). Additionally, new or existing customers may interact with the virtual storefront system via a storefront UI (i.e., virtual storefront UI), where the storefront UI forms a part of the business-to-customer (B2C) side of the system (e.g., system 300 in FIG. 3). In some embodiments, the storefront UI (or virtual storefront UI) may be generated from a virtual storefront template. In other words, the virtual storefront template may serve as the parent or structure of the virtual storefront UI, and may dictate the layout, look, feel, and/or presentation of data displayed using the virtual storefront UI. In some embodiments, new or existing customers may utilize the virtual storefront system for one or more of receiving product recommendations, quotes, and/or sales proposals; getting qualified or pre-qualified for a product or service; and receiving live support, to name a few non-limiting examples.

FIG. 1 illustrates a system 100 configured for optimizing customer acquisition, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of product recommendation request receiving module 108, site image uploading module 110, site information determination module 112, product identifying module 114, quote generating module 116, quote display module 118, user template accessing module 120, qualification status determination module 122, contractor preference identifying module 124, accuracy level determination module 126, product determination module 128, question receiving module 130, survey generating module 132, qualification status display module 134, upload module 136, supporting document module 138, data analysis module 140, set receiving module 142, virtual storefront template generating module 144, performance parameter acquiring module 146, performance parameter comparing module 148, experimentation variable specification module 150, optimization experiment execution module 152, sale support request receiving module 154, identifier generating module 156, user communication module 158, virtual storefront module 160, and/or other instruction modules.

Product recommendation request receiving module 108 may be configured to receive, from a user device, a product recommendation and/or a quote request. The product recommendation request may include one or more of product preferences and a location. The product preferences may include a project budget or pricing information, to name two non-limiting examples. In other cases, for instance, for a solar panel installation project, a customer/homeowner may request a specific "system offset", which refers to the percentage of their electric bill that they wish to offset with solar. The higher the offset, the greater the number of solar panels that may be required (i.e., higher cost/project budget). Additionally or alternatively, the product recommendation and/or quote request may also comprise receiving, from a user or homeowner, data related to site conditions (e.g., size of backyard, electrical or plumbing lines, slope of roof, roof area, etc.) and lifestyle preferences. For instance, lifestyle preferences may include whether or not the user or homeowner plans to buy an electric vehicle (EV) or a hot tub, or whether the homeowner plans to have additional people (e.g., new children or grandparents) in the house in the near future. In some cases, demographic data and/or behavioral data for the user may be collected based on location data, user input (e.g., by providing user with a questionnaire), or through any other means (e.g., targeting and advertising cookies stored on the user device).

Site image uploading module 110 may be configured to upload one or more site images for the location. The one or more site images may include at least one of aerial images and satellite images. In some cases, the one or more site images may be uploaded by the user, or accessed from a third-party source, such as GOOGLE MAPS provided by Alphabet, Inc., of Mountain View, CA For instance, the system 100 may be configured to access the one or more site images from the third-party source based on location or address information provided by the user via a user input box of the virtual storefront (i.e., storefront UI). In some examples, the site images may be user uploaded. For instance, the user may take a picture of their home from their front yard and upload it using the site image uploading module 110. In some cases, the system 100 may be configured to analyze the user uploaded image to determine a geometry or dimension of the roof, for instance. In some cases, the one or more site images may also be accompanied with Light Detection and Ranging (LIDAR) data. LIDAR refers to a remote sensing method that utilizes light in the form of a pulsed laser to measure distances or ranges by targeting an object with the pulsed laser and measuring the time for the reflected light to return to the receiver. In some cases, smartphones, tablets, etc., may be equipped with LIDAR scanners for augmented reality (AR) and/or virtual reality (VR) applications. LIDAR scanners may also be utilized to generate a 3D virtual rendition of a physical space, such as a room, a house, a backyard, a front yard, a roof, etc.

Site information determination module 112 may be configured to determine site specific information based on the one or more site images and the location. Additionally or alternatively, the site information determination module 112 may be configured to determine site specific information based at least in part on the request. By way of non-limiting example, the site specific information may include one or more of geospatial data, weather data, solar irradiance data, and information pertaining to nearby or adjacent structures.

Product identifying module 114 may be configured to identify one or more products for recommendation based on the site specific information, the product recommendation and/or quote request, or a combination thereof. The one or more products may each be associated with a contractor, a virtual storefront (or storefront UI), and/or a virtual storefront template. For the purposes of this disclosure, the terms "storefront user template", "virtual storefront template", and "storefront template" may be used interchangeably throughout this application. Further, one or more virtual storefronts (or storefront UIs) may be generated from at least one virtual storefront template. It should be noted that, the virtual storefront is the actual user interface displayed to a customer, and accessed from their user device. In some cases, the product identifying module 114 may also refine the one or more products for recommendation based on analyzing additional information specific to the site, the project, user requirements, product inventory, discount options, and/or financing options, to name a few non-limiting examples. For instance, the product identifying module 114 may identify a first product for recommendation based on the user requesting a 5 kW solar panel system. However, the product identifying module 114 may determine based on the site specific information that the user's roof does not have sufficient area for installing a 5 kW solar panel system and can only accept a 3 kW solar panel system. In this case, the product identifying module 114 may refine the one or more products for recommendation by replacing at least a portion of the products initially identified.

In some embodiments, quote generating module 116 may be configured to generate a quote for at least one product of the one or more products. Generating the quote for the at least one product may be based on a respective accuracy level (also referred to as recommendation quality level) for the at least one product exceeding a threshold accuracy level. In some examples, the quote generating module 116 may identify one or more fixed costs (e.g., product cost, delivery cost, etc.) and variable costs (e.g., installation cost, labor cost, etc.) for the project. The variable costs, also referred to as adders, may be specific to the product recommendation and/or quote request. In some circumstances, variable costs or adders can vary widely between projects using similar components or products. For instance, installation of the same solar panel system on a sloped roof may vary in cost as compared to installation on a flat roof. Some variable costs or adders are indeterminable without additional data about the project site. According to aspects of this disclosure, the quote generating module 116 may consider both fixed and variable costs for quote generation, which may serve to enhance the accuracy of the total project cost provided to the user. The variable costs or adders may be determined based on information received from the site information determination module 112, contractor preference identifying module 124, or any of the other modules described herein. In some examples, a contractor may specify the variable costs or adders to be included in a quote. Alternatively, variable costs or adders may be estimated based on similar projects (i.e., for the same or a different contractor) at or near the location. In some cases, the variable costs or adders may be determined based on one or more supplemental documents, photos, etc., submitted by the user. In some circumstances, supplemental or supporting documents may be required to produce/display any level of quote, for instance, when the accuracy of the input data (e.g., geospatial, weather, site information data, etc.) is too low or not available. In other cases, supplemental documentation may be required for certain types of projects, and not others. In some cases, the ingestion of this user supplied supplemental data (e.g., photos, documents, etc.) may also serve to enhance the accuracy of the pricing estimate (or quote) provided by the quote generating module 116. In some cases, supplemental documents may be received by the supporting document module 138, further described below.

Quote generating module 116 may be configured to generate a second quote for at least one of the one or more additional products.

In some embodiments, one or more of the quote generating module 116 and the product identifying module 114 may be configured to receive information pertaining to the product recommendation(s) and/or quote(s) from a third party product recommendation/quote system. In some cases, the information from the third party system may be received via a third party API, or through any other applicable means. Further, the quote generating module and/or the product identifying module may one or more of process the data from the third party system, determine the relevant portions, modify the data or relevant portions of the data (if needed), and display it using the virtual storefront UI.

Quote display module 118 may be configured to display, on the user device, the quote for the at least one product. Quote display module 118 may be configured to display the second quote on the user device. In some embodiments, the quote display module 118 may be configured to display at least one of a product recommendation, a sales proposal, and a quote for at least one product of the one or more products via the first virtual storefront (i.e., storefront UI) accessed from the user device.

User template accessing module 120 may be configured to access, from the user device, a first virtual storefront (i.e., storefront UI), where the first virtual storefront may be generated using the first virtual storefront template. In some examples, the first virtual storefront template may be associated with a first product of the at least one product. The first virtual storefront template and/or the first virtual storefront UI may be linked to a first contractor. In some cases, the first virtual storefront UI generated using the first virtual storefront template may be capable of being accessed to obtain product recommendations, quotes, or a combination thereof.

Qualification status determination module 122 may be configured to determine, for a user associated with the user device, a qualification status for the first product. In some cases, the first product may be a physical product (e.g., solar panels) sold or provided by the contractor. In other cases, the first product may be a service (e.g., solar panel installation) provided by the contractor. In yet other cases, the first product may be a combination of a physical product and associated service provided by the contractor. Accessing the first virtual storefront UI may further include receiving, via the user device, a pre-qualification request for the first product. Determining the qualification status may include determining a qualification level for the customer/homeowner. For example, comparing a credit score associated with the credit check for the user to a threshold credit score. The qualification score may be specific to the user and the first product. In some cases, determining the qualification status may be based on a binary qualifier (e.g., is the user the homeowner or a renter, does the user's income meet a minimum income threshold, to name two non-limiting examples).

Contractor preference identifying module 124 may be configured to identify one or more of contractor specified preferences, available product options (e.g., product options provided by the contractor), pricing for at least a portion of the available product options (i.e., pricing data for the product options), information pertaining to one or more projects (e.g., other completed projects) at or near the location—which may be used to calculate a look-a-like score, available financing options (e.g., loans, credit card(s), etc.), available product inventory, and/or discount or packaging opportunities (e.g., 10% off if first time customer, $500 off if referred by an existing customer, etc.), to name a few non-limiting examples.

Accuracy level determination module 126 may be configured to determine an accuracy level or recommendation quality level for at least a portion of the one or more products based on one or more of input data quality. By way of non-limiting example, the input data quality may be based in part on the site specific information, the one or more contractor specified preferences, and the information pertaining to other completed projects at or near the location. In some cases, the accuracy level determination module 126 may be configured to apply at least one model, such as a machine learning model, a predictive model, a logic based model, etc., to determine the accuracy level. The machine learning model may comprise a supervised or unsupervised machine learning model, for instance. In this way, the accuracy level may become more optimized over time and as more and more data (e.g., projects related data) is made available. In some cases, generating the quote for the at least one product may be based on a respective accuracy level for the at least one product exceeding a threshold accuracy level.

Product determination module 128 may be configured to determine one or more additional products for cross-sell or up-sell to the user based at least in part on the demographic data, behavioral data, or a combination. At least one of the one or more additional products may be associated with a virtual storefront template, for instance, for a contractor. In some cases, the product determination module 128 may be configured to apply at least one machine learning model and/or logic based model to determine the one or more additional products for cross-sell or up-sell. As an example, the machine-learning model (e.g., supervised or unsupervised machine learning model) or logic based model may receive as input data pertaining to additional products displayed to one or more other users for cross-sell or up-sell. In some cases, the one or more other users may share certain demographic or behavioral characteristics as the user. Alternatively, the one or more other users may reside at or near the user's location, for instance, in the same zip code, same city, same county, same state, etc. Further, the input data to the machine-learning model may also comprise an indication of the conversion rate, revenue generated, return on advertising spend (ROAS), etc., for the cross-sell or up-sell products (or services). In this way, the product determination module 128 may present cross-sell or up-sell products that are more likely to generate higher revenue or sales for the contractor.

Question receiving module 130 may be configured to receive, from a second user device, one or more questions and a respective answer for at least one of the one or more questions. The second user device may be associated with a contractor. In some examples, the second user device may also be referred to as an administrator or contractor device. Laptops, smartphones, and/or tablets are some non-limiting examples of administrator devices.

Survey generating module 132 may be configured to generate a qualification/screening survey based on the one or more questions and respective answers. Determining the qualification status may include initiating, via the first virtual storefront UI accessed from the user device, one or more of the qualification/screening survey and a credit check. Determining the qualification status may include receiving, via the user device, one or more responses for the survey. By way of non-limiting example, the one or more responses for the qualification/screening survey may be compared with the one or more questions and respective answers for determining the qualification status. For instance, the survey generating module 132 may generate a screening survey requesting the user to indicate whether they own the property, their income (e.g., monthly, weekly, bi-weekly, annually), maximum amount they can put down as deposit, any additional sources of income (e.g., alimony, child support, scholarship, etc.), any other loans in their name (e.g., auto loans, student loans, etc.) and/or any delinquencies (e.g., missed rent or mortgage payments, missed credit card payments, etc.), to name a few non-limiting examples.

Qualification status display module 134 may be configured to display an approved qualification status for the user based on the qualification score being at or above a threshold. In some cases, the qualification score may be based on numerous inputs, including a credit score for the user and/or responses to the screening survey.

Qualification status display module 134 may be configured to display an indeterminable qualification status for the user based on the qualification score being below the threshold. In some cases, the user may be assigned an indeterminable qualification status even if their credit score is above a threshold credit score, for instance, if the solar viability based on surrounding vegetation is not clear. In some cases, the user may be assigned a disqualified status even if their credit score, roof shading, income level, etc., meets minimum requirements for the contractor, for instance, if the user indicates that they are a renter rather than a homeowner. In other words, numerous qualification factors may be considered by the qualification status display module 134 and/or the qualification status determination module 122 in order to determine and display one of an approved qualification status, an indeterminable qualification status, or a disqualified status for the user. Some non-limiting examples of qualification factors include financing qualification factors (e.g., a credit score, income, other outstanding debt, etc.) and product qualification factors (i.e., is the customer/user qualified for the product, based on homeownership, site quality, etc.). In some cases, the qualification factors may be weighted equally in order to determine one of the approved, indeterminable, or disqualified status for the user. Alternatively, some qualification factors may be assigned a higher weight (e.g., credit score is weighed more heavily than income) or an absolute weight (e.g., regardless of credit score, income, willingness to pay in full in cash, etc., the user will be disqualified if they are not the homeowner, or if they live in an apartment for a solar panel project) for determining the qualification status.

Upload module 136 may be configured to display, on the user device, a prompt requesting the user to upload one or more supporting documents for determining a final qualification status based on the displayed indeterminable qualification status. Determining the final qualification status may include one of updating the indeterminable qualification status to the approved qualification status or updating the indeterminable qualification to a not approved (or disqualified) qualification status.

Supporting document module 138 may be configured to receive, via the user device, at least one supporting document of the one or more supporting documents.

Data analysis module 140 may be configured to analyze data from the at least one supporting document. Determining the final qualification status may be based at least in part on the analyzing the data from the at least one supporting document. By way of non-limiting example, the analyzing may include one or more of parsing textual information, optical character recognition, and image recognition. As an example, a user may be assigned an indeterminable qualification status based on unclear shading from surrounding trees. However, the user may provide supporting imagery of their home taken from the ground that may enable the contractor to have a full view of the surrounding tree coverage and vegetation that may be inhibiting solar production. In such cases, the user's status may be updated to a disapproved qualification status.

Set receiving module 142 may be configured to receive, from a second user device or an administrator device, a first set of specifications and/or inputs for the first virtual storefront template. The second user device may be associated with a contractor. The first set of specifications and/or inputs may comprise one or more of a format (e.g., text size, text font, and any other applicable UI related information) for furnishing the first virtual storefront template, a per unit product cost input (e.g., dollars per watt) for modeling prices, promotions or discounts provided by the contractor, service area defining lists (e.g., cities, towns, counties, etc., where contractor operates), financing terms, and/or information pertaining to the calculation outputs. Some non-limiting examples of information pertaining to the calculation outputs may include the type of information (e.g., estimated tax savings, estimated home value increase, estimated energy savings over 5 years, 10 years, etc., hours of usable sunlight/year, estimate backup power duration per month or year, etc.) for presenting via the virtual storefront template. In some examples, the set receiving module 142 may also be configured to display a list of available virtual storefront templates for use by the contractor. In such cases, the set receiving module 142 or any other module may be configured to receive the contractor input (e.g., a selection of one virtual storefront template from the list of virtual storefront templates) and store an indication of the selected virtual storefront template to memory (e.g., shown as memory 1003 in FIG. 10). In some examples, the first storefront UI may be generated from the first virtual storefront template, where the first virtual storefront template may be selected from a list of available virtual storefront templates, or alternatively, generated based on the specifications and/or inputs received from the contractor. It should be noted that other specifications and/or inputs not listed above are contemplated in different embodiments. Further, the set receiving module 142 may be configured to modify the specifications and/or inputs prior to generating the first virtual storefront template based on behavioral or demographic data for the user, analyzing performance results for other virtual storefront templates associated with one or more other contractors, and/or location information (e.g., the system 100 may accentuate cost savings in California and backup power duration in Michigan, to name two non-limiting examples).

Set receiving module 142 may be configured to receive, from the second user device, a second set of specifications and/or inputs for a second virtual storefront template. In some cases, the second virtual storefront template may be used to generate a second storefront UI. In some cases, the first and second virtual storefront templates and/or UIs may be associated with the same contractor. Furthermore, the first and second virtual storefront templates may be associated with the first product, and one or more other products or services provided by the contractor.

Virtual storefront template generating module 144 may be configured to generate the first virtual storefront template based on the first set of specifications and/or inputs. In some embodiments, the first virtual storefront template may be used to display a first set of data in a first format. For instance, the first virtual storefront (or storefront UI) may be generated from the first virtual storefront template and may display the first set of data in the first format to a customer when accessed from a user device.

Virtual storefront template generating module 144 may be configured to generate the second virtual storefront template by applying the second set of specifications and/or second set of inputs to the first virtual storefront template. As noted above, the second virtual storefront (or storefront UI) may be generated from the second virtual storefront template. In some embodiments, the second virtual storefront template may be used to display one of the first set of data or a second set of data in a second format, where the first format is different from the second format (i.e., the first and second virtual storefront templates use different themes, styles, font, font size, layout, format, etc.). In other words, the first and second virtual storefront templates may have one or more visual differences. In some cases, the first set of data comprises a first price and the second set of data comprises a second, different price. In other cases, the first set of data may comprise tax savings and home value increase, while the second set of data may comprise backup power duration and energy savings, to name a few non-limiting examples. In some embodiments, the virtual storefront template generating module 144 may be configured to modify at least a portion of the first virtual storefront template based on analyzing the one or more first performance results (e.g., performance results for the first virtual storefront UI). For instance, the virtual storefront template generating module 144 may identify that a higher revenue or conversion rate may be obtained by reducing the price input (e.g., by 5%) used to model prices. In other words, even though revenue per project may be lower, the higher volumes may serve to increase the overall revenue or profit for the contractor. In such cases, the second virtual storefront template may be used in favor of the first virtual storefront template.

Performance parameter acquiring module 146 may be configured to acquire one or more first performance parameters (or first performance results) for the first virtual storefront template. For instance, the performance parameter acquiring module 146 may acquire one or more first performance parameters (or results) for the first virtual storefront UI generated from the first virtual storefront template.

Performance parameter acquiring module 146 may be configured to acquire one or more second performance parameters (or second performance results) for the second virtual storefront template. For instance, the performance parameter acquiring module 146 may acquire one or more second performance parameters (or results) for the second virtual storefront UI generated from the second virtual storefront template.

Performance parameter comparing module 148 may be configured to compare the one or more second performance parameters or results to the one or more first performance parameters or results to determine an optimal virtual storefront template between the first and the second virtual storefront template. Some non-limiting examples of performance parameters or results that may be compared include revenue per virtual storefront template, leads generated per virtual storefront template, click-through-rate per virtual storefront template, and/or conversion rate per virtual storefront template. In some cases, the performance parameters or results may also comprise a load time or glitches/errors per virtual storefront template.

Experimentation variable specification module 150 may be configured to specify, via the second user device, one or more experimentation parameters or experimentation variables for an optimization experiment. The optimization experiment may be used to compare at least the first and second virtual storefront templates, for instance, at least the first and second virtual storefront UIs generated from the first and second storefront templates, respectively. In some cases, the optimization experiment may allow a contractor or the system to compare more than two virtual storefront templates, including virtual storefront templates associated with one or more other contractors. By way of non-limiting example, the one or more experimentation parameters or variables may include one or more of a traffic split ratio, a test duration, a success criteria, and termination conditions. In some cases, a multi-arm band (MAB) test may be utilized to determine an optimal virtual storefront template, further described below in relation to FIG. 9.

Optimization experiment execution module 152 may be configured to execute the optimization experiment for comparing the first and second virtual storefront templates based on the one or more experimentation parameters or experimentation variables.

Sale support request receiving module 154 may be configured to receive, via the first virtual storefront UI accessed from the user device, a sales support request.

Identifier generating module 156 may be configured to generate an identifier for the sales support request.

User communication module 158 may be configured to communicate with the user associated with the user device. By way of non-limiting example, the communicating may be based at least in part on a round-robin, first available, or weighted selection method. By way of non-limiting example, the communicating may include utilizing the identifier in one or more of a live chat, an internet voice call, a screen sharing session, and an artificial intelligence or natural language processing based communication.

Virtual storefront module 160 may be configured to generate virtual storefront(s) associated with a plurality of contractors and a plurality of products, including at least the first contractor and the one or more products. Each product of the plurality of products may be linked to a contractor of the plurality of contractors. By way of non-limiting example, the virtual storefront(s) may be configured to receive one or more of lender criteria data, portal configuration data, contractor preferences data, virtual storefront templates data, experimentation parameters or experimentation variables data, geospatial and weather data, and market data. In some cases, the virtual storefront templates data may include theming and styling related data for furnishing/generating virtual storefront templates for the plurality of contractors.

In some implementations, at least one of the virtual storefront templates may be contractor specific. As used herein, a virtual storefront template may serve as a gateway to the contractor's business and enable a contractor to expand their business presence online. In some cases, the system of the present disclosure may comprise one or more Application Programming Interfaces (APIs) that may be called (e.g., using an API key) from the contractor's existing website or platform. Further, the system 100 may be configured to deliver data and information for furnishing (or generating) the virtual storefront template. In some cases, the virtual storefront template may serve to replace the existing user interface (UI) of the website or platform (e.g., accessible from a kiosk in a home improvements store) associated with the contractor. That is, instead of viewing the existing UI of the website associated with the contractor, new or existing customers may now view a virtual storefront UI generated by the system of the present disclosure, for instance, when they arrive at a URL or HTTP address associated with the contractor (e.g., www.contractor.com). Alternatively, the system 100 may generate an embeddable app (e.g., a mobile app, a web app, etc.) for a contractor, where the app may be embedded within an existing website associated with the contractor. In one non-limiting example, the embeddable app may be displayed using Inline Frame (IFrame). IFrame refers to an HTML document embedded inside another HTML document on a website. Iframe HTML elements may be used to insert content from another source, such as an advertisement, into a web page. According to aspects of this disclosure, IFrames may be installed into a contractor's website, blog, or any other applicable platform, and may be used to insert data received from the virtual storefront system. Thus, in some aspects, the embedded app (i.e., virtual storefront UI) may serve as a website within a website, which may allow user's arriving at the contractor's website to access the virtual storefront UI generated by the system 100.

In some other cases, a widget (e.g., an interstitial or side bar overlay widget) may be added to the contractor's website or platform. The widget may receive information from the virtual storefront system, where the information may include product recommendations, quotes, sales proposals, etc., for one or more products or services sold by the contractor. In some cases, the widget may also support a web chat feature, which may allow a customer to communicate with a sales support agent (e.g., human agent, AI agent).

In yet other cases, a virtual storefront template may be implemented using a microsite. For example, a microsite (i.e., virtual storefront template) may be generated based on contractor input (e.g., received via storefront setup wizard 401 in FIG. 4), and may be used to display the virtual storefront UI. A microsite refers to an individual web page or a cluster of web pages that are designed to function as a discrete entity in conjunction with an existing website. In some cases, a microsite may be associated with its own domain name or subdomain. For instance, the contractor s website may be associated with a first domain name (e.g., www.contractor.com), while the microsite may be associated with a second different domain (e.g., www.demandiq .com) or alternatively, a subdomain of the first domain (e.g., www.virtual.contractor.com). In one non-limiting example, the microsite may be associated with a domain name or a subdomain associated with the system 100.

In some implementations, server(s) 102, client computing platform(s) 104, and/or external resources 162 may be operatively linked via one or more electronic communication links. For example, such electronic communication links may be established, at least in part, via a network 170 such as the Internet and/or other networks. It will be appreciated that this is not intended to be limiting, and that the scope of this disclosure includes implementations in which server(s) 102, client computing platform(s) 104, and/or external resources 162 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 162, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 162 may include sources of information outside of system 100, external entities participating with system 100, and/or other resources. In some implementations, some or all of the functionality attributed herein to external resources 162 may be provided by resources included in system 100.

Server(s) 102 may include electronic storage 164, one or more processors 166, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 164 may comprise non-transitory storage media that electronically stores information. The electronic storage media of electronic storage 164 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 164 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 164 may include one or more virtual storage resources (e.g., cloud storage, a virtual private network, and/or other virtual storage resources). Electronic storage 164 may store software algorithms, information determined by processor(s) 166, information received from server(s) 102, information received from client computing platform(s) 104, and/or other information that enables server(s) 102 to function as described herein.

Processor(s) 166 may be configured to provide information processing capabilities in server(s) 102. As such, processor(s) 166 may include one or more of a digital processor, an analog processor, a digital circuit designed to process information, an analog circuit designed to process information, a state machine, and/or other mechanisms for electronically processing information. Although processor(s) 166 is shown in FIG. 1 as a single entity, this is for illustrative purposes only. In some implementations, processor(s) 166 may include a plurality of processing units. These processing units may be physically located within the same device, or processor(s) 166 may represent processing functionality of a plurality of devices operating in coordination. Processor(s) 166 may be configured to execute modules 108, 110, 112, 114, 116, 118, 120, 122, 124, 126, 128, 130, 132, 134, 136, 138, 140, 142, 144, 146, 148, 150, 152, 154, 156, 158, and/or 160, and/or other modules. Processor(s) 166 may be configured to execute modules 108, 110, 112, 114, 116, 118, 120, 122, 124, 126, 128, 130, 132, 134, 136, 138, 140, 142, 144, 146, 148, 150, 152, 154, 156, 158, and/or 160, and/or other modules by software; hardware; firmware; some combination of software, hardware, and/or firmware; and/or other mechanisms for configuring processing capabilities on processor(s) 166. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, 134, 136, 138, 140, 142, 144, 146, 148, 150, 152, 154, 156, 158, and/or 160 are illustrated in FIG. 1 as being implemented within a single processing unit, in implementations in which processor(s) 166 includes multiple processing units, one or more of modules 108, 110, 112, 114, 116, 118, 120, 122, 124, 126, 128, 130, 132, 134, 136, 138, 140, 142, 144, 146, 148, 150, 152, 154, 156, 158, and/or 160 may be implemented remotely from the other modules. The description of the functionality provided by the different modules 108, 110, 112, 114, 116, 118, 120, 122, 124, 126, 128, 130, 132, 134, 136, 138, 140, 142, 144, 146, 148, 150, 152, 154, 156, 158, and/or 160 described below is for illustrative purposes, and is not intended to be limiting, as any of modules 108, 110, 112, 114, 116, 118, 120, 122, 124, 126, 128, 130, 132, 134, 136, 138, 140, 142, 144, 146, 148, 150, 152, 154, 156, 158, and/or 160 may provide more or less functionality than is described. For example, one or more of modules 108, 110, 112, 114, 116, 118, 120, 122, 124, 126, 128, 130, 132, 134, 136, 138, 140, 142, 144, 146, 148, 150, 152, 154, 156, 158, and/or 160 may be eliminated, and some or all of its functionality may be provided by other ones of modules 108, 110, 112, 114, 116, 118, 120, 122, 124, 126, 128, 130, 132, 134, 136, 138, 140, 142, 144, 146, 148, 150, 152, 154, 156, 158, and/or 160. As another example, processor(s) 166 may be configured to execute one or more additional modules that may perform some or all of the functionality attributed below to one of modules 108, 110, 112, 114, 116, 118, 120, 122, 124, 126, 128, 130, 132, 134, 136, 138, 140, 142, 144, 146, 148, 150, 152, 154, 156, 158, and/or 160.

FIGS. 2A, 2B, 2C, 2D, 2E, 2F, 2G, 2H, 2I, 2J, 2K, and/or 2L illustrate methods 200-*a*-1 for optimizing customer acquisition, in accordance with one or more implementations. The operations of methods 200-*a*-1 presented below are intended to be illustrative. In some implementations, methods 200-*a*-1 may be accomplished with one or more additional operations not described, and/or without one or more of the operations discussed. Additionally, the order in which the operations of method 200-*a*-1 are illustrated in FIGS. 2A, 2B, 2C, 2D, 2E, 2F, 2G, 2H, 2I, 2J, 2K, and/or 2L and described below is not intended to be limiting.

In some implementations, methods 200-a-1 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200-a-1 in response to instructions stored electronically on an electronic storage medium. The one or more processing devices may include one or more devices configured through hardware, firmware, and/or software to be specifically designed for execution of one or more of the operations of methods 200-a-1.

Figure 2A:
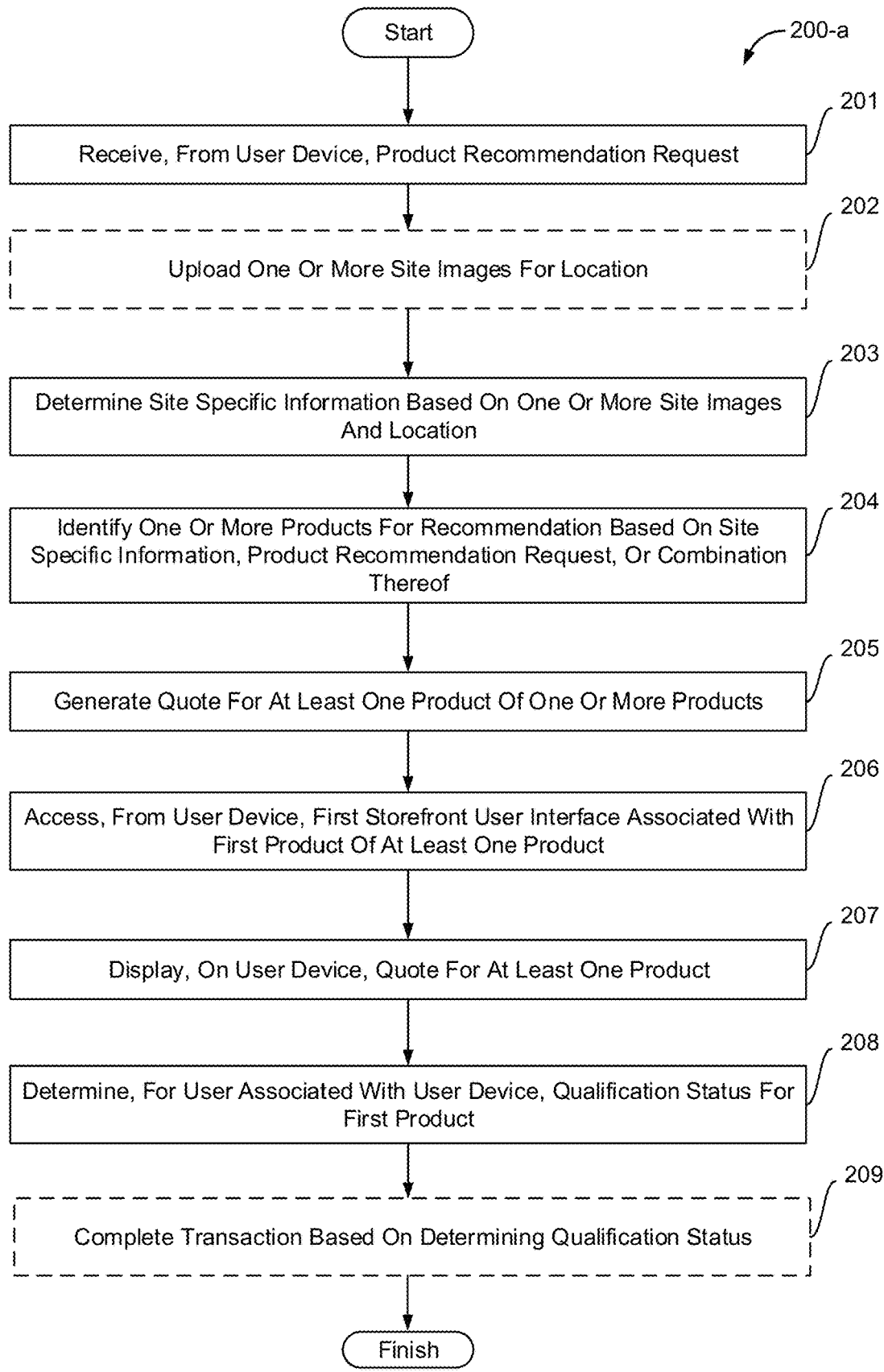
FIGS. 2A, 2B, 2C, 2D, 2E, 2F, 2G, 2H, 2I, 2J, 2K, and/or 2L illustrate a method for generating and optimizing virtual storefront templates, in accordance with one or more implementations.

FIG. 2A illustrates method 200-a, in accordance with one or more implementations.

A first operation 201 may include receiving, from a user device, a product recommendation request. The product recommendation request may include one or more of product preferences and a location. The product preferences may include a budget or pricing information. As an example, a potential customer (or user) may make a product recommendation request via a virtual storefront or storefront UI. In some examples, the virtual storefront or storefront UI may be generated from a virtual storefront template. In some examples, this storefront UI may or may not be contractor specific. Further, the potential customer may provide one or more product preferences and situational specifications (e.g., a utility bill, a location, to name a few non-limiting examples). In some cases, the product preferences may include, but not limited to, a budget, a size or coverage area, material, etc. In some cases, the location may include an exact address (e.g., a residential address), GPS coordinates, a Zip code, a street intersection, etc. In some embodiments, the location data received from the customer may be utilized to acquire geospatial data, or property data further described below. In some embodiments, first operation 201 may be performed by one or more hardware processors configured by machine-readable instructions including a module that is the same as or similar to product recommendation request receiving module 108, in accordance with one or more implementations.

A second operation 202 (shown as optional by the dashed lines) may include uploading one or more site images for the location. The one or more site images may include at least one of aerial images and satellite images. In some cases, the satellite or aerial images may be acquired from a third party service, such as GOOGLE MAPS provided by Alphabet Inc., of Mountain View, CA, BING MAPS provided by Microsoft Inc., of Redmond, WA, etc., to name a few non-limiting examples. In some cases, the one or more site images may be uploaded by the user associated with the user device. For instance, the user may upload one or more images of their home or property from their front yard, which may enable the system to determine geometric data or dimensions related data (e.g., roof dimensions) by analyzing said images. In some cases, the one or more site images may be accompanied with LIDAR data, or any other applicable data that may assist in generating quotes and product recommendations. Second operation 202 may be performed by one or more hardware processors configured by machine-readable instructions including a module that is the same as or similar to site image uploading module 110, in accordance with one or more implementations.

A third operation 203 may include determining site specific information based on the one or more site images and the location. The site specific information may include one or more of geospatial data, site measurement data, weather data, solar irradiance data, and information pertaining to nearby or adjacent structures. In some cases, the system of the present disclosure may determine one or more additional specifications (i.e., site specific information) about the property based on analysis of the acquired satellite or aerial images. For instance, the satellite or aerial images associated with the location may be used to determine a roof area available for solar panel installation, property measurements for determining a lawn area, a drive-way area, backyard area, etc., pitch and/or orientation of the location (e.g., relative to the sun), to name a few non-limiting examples. In some cases, the pitch and/or orientation of the location, the roof area, local solar irradiance, weather patterns, etc., may be utilized, for instance, for a solar panel installation project. The type of data acquired from the satellite or aerial images, user uploaded images, LIDAR data, etc., may be different based on the type of project requested by the customer. For instance, in one example, the system may not take into account the local solar irradiance or pitch/orientation of the location for a re-roofing project request but may instead focus on the roof area and/or weather patterns. Third operation 203 may be performed by one or more hardware processors configured by machine-readable instructions including a module that is the same as or similar to site information determination module 112, in accordance with one or more implementations.

A fourth operation 204 may include identifying one or more products for recommendation based on the site specific information, the product recommendation request, or a combination thereof. For instance, the system may determine one or more product specifications based on one or more of the local solar irradiance and weather patterns data, pricing data, available product options, etc. In some cases, the pricing data may refer to one or more of: the budget or price limit set by the customer (e.g., $10 k, $20 k, etc.), contractor prices for the location (e.g., $100/hour, $3/watt, etc.), contractor prices for similar projects or tasks completed at or near the location (e.g., $15 k), to name a few non-limiting examples. In some embodiments, the one or more products may be associated with a virtual storefront template or storefront UI, further described in relation to the figures below. Fourth operation 204 may be performed by one or more hardware processors configured by machine-readable instructions including a module that is the same as or similar to product identifying module 114, in accordance with one or more implementations.

A fifth operation 205 may include generating a quote and/or sales proposal for at least one product of the one or more products. As used herein, a quote may be used to display financial information, such as a product cost, project cost, labor cost, etc. In some cases, the different costs associated with the quote may be itemized. Further, a sales proposal may be used as a way of conveying information to the new or existing customer and may be akin to a sales pitch. In some instances, the sales proposal may or may not include the quote. Further, a contractor may pitch their products and/or services to new and existing customers using the sales proposal. In some non-limiting examples, sales proposals may comprise additional information not conveyed by the quote, such as, long-term cost savings, tax savings, home value increase, installation timeline, etc. In some cases, the product recommendation, quote, and/or sales proposal may be delivered using a microsite, where the microsite is linked to the first virtual storefront template and displays the first virtual storefront UI. Other delivery methods, utilizing an interstitial, popup, or overlay widget (e.g., on an existing contractor website) are also contemplated. In yet other cases, sales proposals and/or quotes may be delivered using text (i.e., SMS), voice (e.g., via Amazon Echo and Alexa devices provided by Amazon, Inc., of Seattle, Washington; Google Home provided by Alphabet, Inc., of Mountain View, CA), and/or email. In some instances, the delivery method may be used as a variable while comparing different virtual storefront templates. For instance, a contractor may compare performance results for a first virtual storefront template (e.g., implemented as a microsite) and a second virtual storefront template (e.g., implemented as an embeddable app) to determine an optimal virtual storefront template for generating future storefront UIs, as well as a delivery method for presenting storefront UIs. In another example, a contractor may compare performance results for a first virtual storefront template (e.g., text based, where the user/customer receives the sales proposals and/or quotes as a text message on their smart phone) and a second virtual storefront template (e.g., voice based, where the user/customer receives the sales proposals/quotes as a voicemail on their phone, or alternatively, on their smart home device, such as Amazon Echo/Alexa) to determine which delivery method is more optimal for a given set of input factors (e.g., location; demographic data, behavioral data for the user, etc.). Fifth operation 205 may be performed by one or more hardware processors configured by machine-readable instructions including a module that is the same as or similar to quote generating module 116, in accordance with one or more implementations.

A sixth operation 206 may include accessing, from the user device, the first virtual storefront or storefront UI. In some cases, the first virtual storefront or storefront UI may be associated with the at least one product and/or a first contractor. Further, the first virtual storefront UI may be generated from the first virtual storefront template, for instance, by populating one or more data fields in the first virtual storefront template. As noted above, the design and layout (e.g., theming and styling) of the first virtual storefront template, as well as the information displayed using the first storefront UI (i.e., generated using the first virtual storefront template) may depend on a plurality of input factors. Some non-limiting examples of input factors include information pertaining to the location (i.e., locational data), demographic data (e.g., age, gender, political affiliation), and/or behavioral data (e.g. browsing history, cookie information for one or more websites the user visited before arriving at the virtual storefront, number of times the user visited the storefront, etc.) for the user. In some cases, sixth operation 206 may be performed by one or more hardware processors configured by machine-readable instructions including a module that is the same as or similar to user template accessing module 120, in accordance with one or more implementations.

A seventh operation 207 may include displaying, on the user device, the quote and/or proposal for the at least one product, such as a first product associated with the first contractor. In some cases, the proposal may be a sales proposal. Seventh operation 206 may be performed by one or more hardware processors configured by machine-readable instructions including a module that is the same as or similar to quote display module 118, in accordance with one or more implementations.

An eighth operation 208 may include determining, for a user associated with the user device, a qualification status for the first product. The qualification status may be determined based on receiving one or more answers for a qualification/screening survey. Additionally or alternatively, the qualification status may be determined based on comparing a credit score for the user to a threshold credit score. In other cases, the qualification status may be in part determined by supplying a third-party qualification system with a set of inputs. One non-limiting example of such a third-party qualification system may comprise that of a financial lending partner. In yet other cases, the qualification status may be determined based on one or more binary qualifiers (e.g., is user the homeowner, is user's income above a minimum income threshold, is user paying for the product or services with cash or in full, etc.). Eighth operation 208 may be performed by one or more hardware processors configured by machine-readable instructions including a module that is the same as or similar to qualification status determination module 122, in accordance with one or more implementations.

A ninth operation 209 (shown as optional by the dashed lines) may include completing a transaction (e.g., user checkout) based on determining the qualification status for the user for the first product. The user may checkout via a contract signing and payments tab (e.g., shown as contract signing tab 503, payment tab 504 in FIG. 5) accessed from the storefront UI (e.g., shown as storefront UI 525 in FIG. 5) displayed on the user device. In some cases, the user may be approved for financing prior to or during checkout. In other cases, the system may allow the user to checkout without financing approval, for instance, if the user is the homeowner and has indicated that he/she is paying upfront in cash for the product and/or service. As noted above, the qualification status may comprise one of an approved, indeterminable, or a disqualified qualification status. In some cases, additional information may be requested from the user if he/she is assigned an indeterminable qualification status. Furthermore, the indeterminable qualification status may be updated to the approved or the disqualified qualification status based on analyzing the additional information (e.g., supporting documents) provided by the user. In some cases, artificial intelligence algorithms (e.g., machine learning, natural language processing) may be deployed to parse and analyze information from the supporting documents. In some cases, the qualification status assigned may be based on numerous factors, such as, a credit score, an income level, homeownership information (e.g., is the user a renter or homeowner), information pertaining to one or more other loans under the user's name, additional income information, etc. Ninth operation 209 may be performed by one or more hardware processors configured by machine-readable instructions including a module that is the same as or similar to qualification status determination module 122, qualification status display module 134, data analysis module 140, user communication module 158, or any other module described in relation to FIG. 1, in accordance with one or more implementations.

Figure 2B:
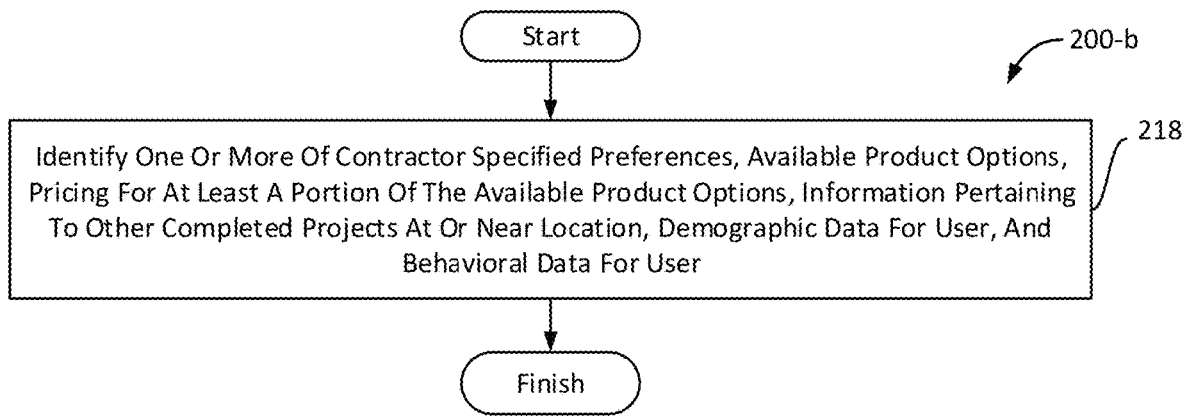

FIG. 2B illustrates method 200-b, in accordance with one or more implementations.

An operation 218 may include identifying one or more of contractor specified preferences, available product options, pricing for at least a portion of the available product options, information pertaining to other completed projects at or near the location, available product inventory, available financing options (e.g., loans, line of credit, credit cards, etc.), and/or discounting options (e.g., 10% discount if new or first time customer, 20% discount if referred by an existing customer, etc.). Operation 218 may be performed by one or more hardware processors configured by machine-readable instructions including a module that is the same as or similar to contractor preference identifying module 124, in accordance with one or more implementations.

Figure 2C:
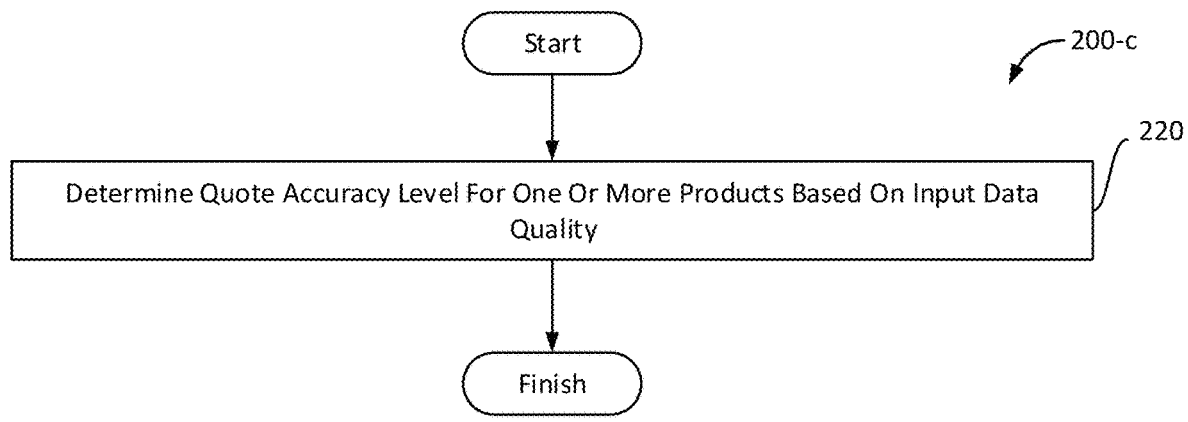

FIG. 2C illustrates method 200-*c*, in accordance with one or more implementations.

In some examples, a determination of accuracy may be made regarding the product recommendation based on input data quality, contractor specified preferences, and/or a look-a-like score based on similar completed projects in close proximity to the customer's location. For instance, an accuracy score may be calculated based on one or more of the input data quality, contractor specified preferences, and the look-a-like score. As used herein, the term "look-a-like score" refers to a metric related to how similar or dissimilar a proposed project is to other projects (i.e., completed, pending) in its proximity. Although not required, in some cases, the proximity may comprise a radius (e.g., 5 mile radius, 10 mile radius, 100 mile, etc.). Alternatively, two projects may be considered "proximal" for the purposes of determining a look-a-like score if they are in the same city, same zip code, same district, same county, or same state, to name a few non-limiting examples. In some cases, different grades of data may be leveraged in the quoting process. Further, in terms of quality, a grade may be defined by the resolution of the aerial or satellite imagery, recency of the aerial or satellite imagery (e.g., <6 months, <2 years, >2 years, etc.), recency of weather data or solar irradiance data, availability (or lack thereof) of pricing data for the location, to name a few non-limiting examples. In some circumstances, the system or a contractor may only provide quotes autonomously based on a certain grade or quality of the input data (e.g., resolution of the aerial or satellite imagery is above a minimum threshold, aerial or satellite images are less than 2 years old, etc.) In such cases, if the grade or quality of the input data is under a minimum threshold specified by the system (or alternatively, the contractor), a human operator may be introduced to provide quality assurance.

In some cases, the system may be configured to compare the accuracy score to a threshold score. If the accuracy score is at or above the threshold of accuracy, the system may be configured to generate a quote and proposal for display to the customer, for instance, on the user device. In other cases, if the accuracy score is below the threshold for accuracy, a human operator may be notified for a quality assurance review and the recommendation may be modified. In some cases, the human operator may request the customer for additional input (e.g., photographs of their property taken within 6 months), or may schedule a site visit at the customer's property.

An operation 220 may include determining an accuracy level for at least a portion of the one or more products based on one or more of input data quality. The input data quality may be based in part on the site specific information, the one or more contractor specified preferences, and the information pertaining to one or more other projects (e.g., one or more other completed projects) at or near the location. Operation 220 may be performed by one or more hardware processors configured by machine-readable instructions including a module that is the same as or similar to accuracy level determination module 126, in accordance with one or more implementations.

Figure 2D:
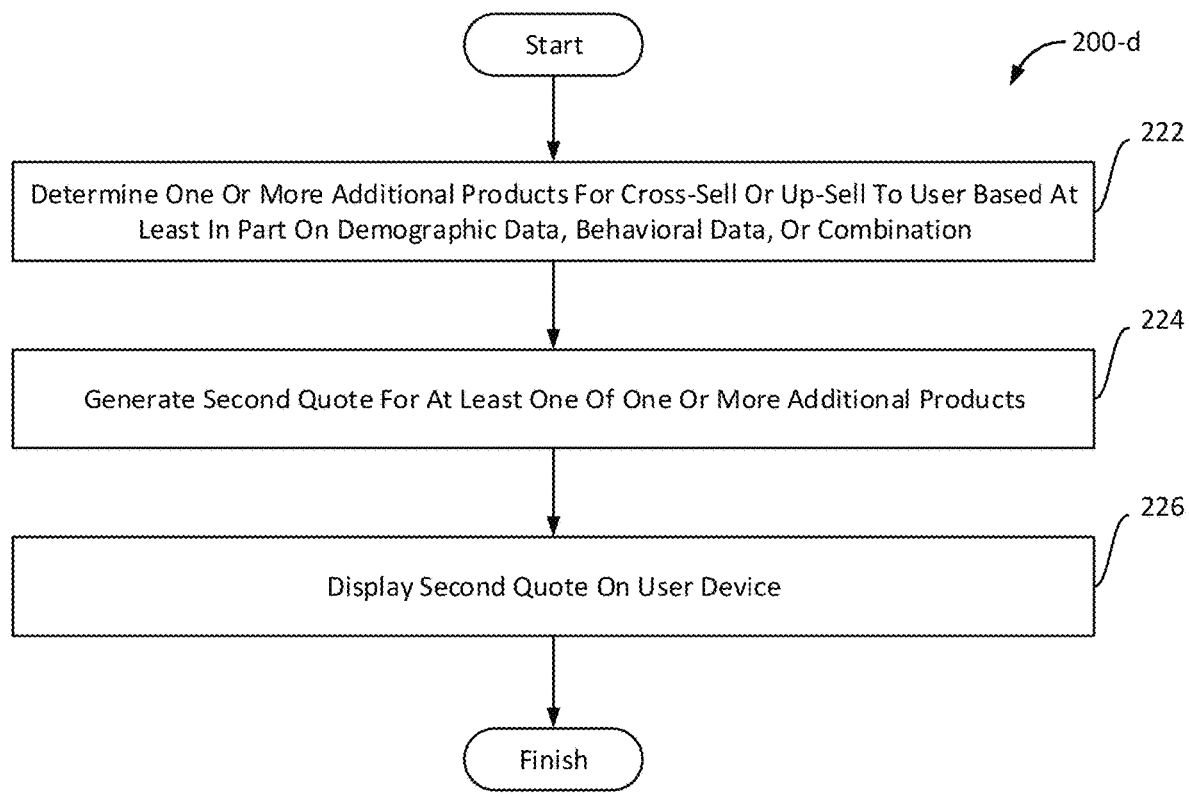

FIG. 2D illustrates method 200-*d*, in accordance with one or more implementations.

A first operation 222 may include determining one or more additional products for cross-sell or up-sell to the user based at least in part on the demographic data, behavioral data, or a combination. At least one of the one or more additional products may be associated with a virtual storefront template. First operation 222 may be performed by one or more hardware processors configured by machine-readable instructions including a module that is the same as or similar to product determination module 128, in accordance with one or more implementations.

A second operation 224 may include generating a second quote for at least one of the one or more additional products. Second operation 224 may be performed by one or more hardware processors configured by machine-readable instructions including a module that is the same as or similar to quote generating module 116, in accordance with one or more implementations.

A third operation 226 may include displaying the second quote on the user device. Third operation 226 may be performed by one or more hardware processors configured by machine-readable instructions including a module that is the same as or similar to quote display module 118, in accordance with one or more implementations.

Figure 2E:
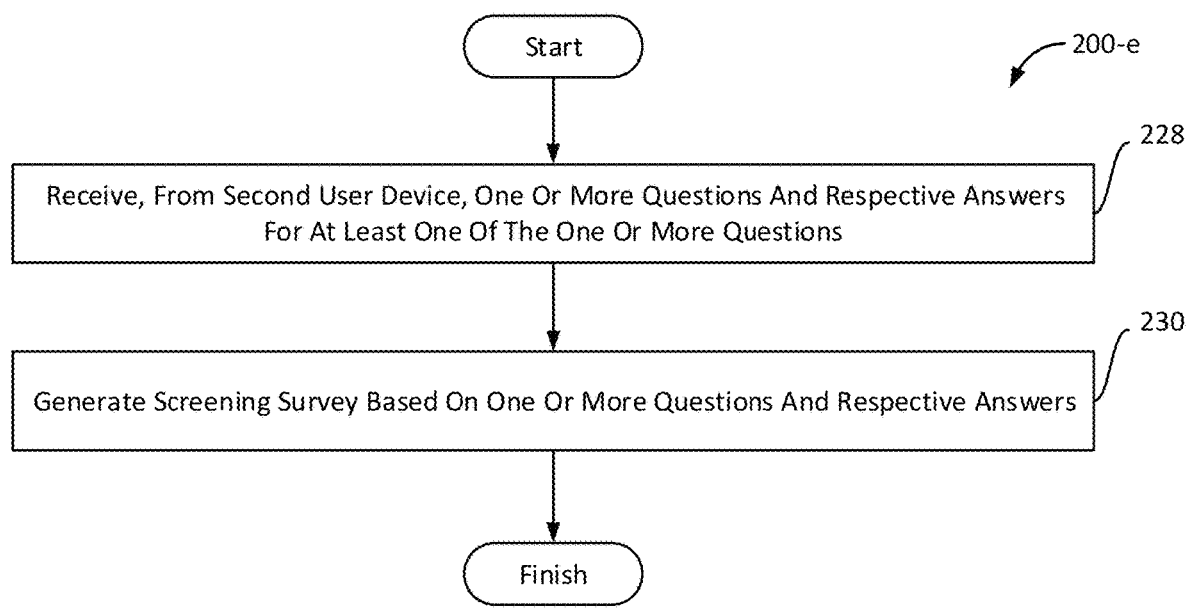

FIG. 2E illustrates method 200-*e*, in accordance with one or more implementations.

A first operation 228 may include receiving, from a second user device or an administrator device, one or more questions and a respective answer for at least one of the one or more questions. The second user device or administrator device may be associated with a contractor. First operation 228 may be performed by one or more hardware processors configured by machine-readable instructions including a module that is the same as or similar to question receiving module 130, in accordance with one or more implementations.

A second operation 230 may include generating a screening survey based on the one or more questions and respective answers. Second operation 230 may be performed by one or more hardware processors configured by machine-readable instructions including a module that is the same as or similar to survey generating module 132, in accordance with one or more implementations.

Figure 2F:
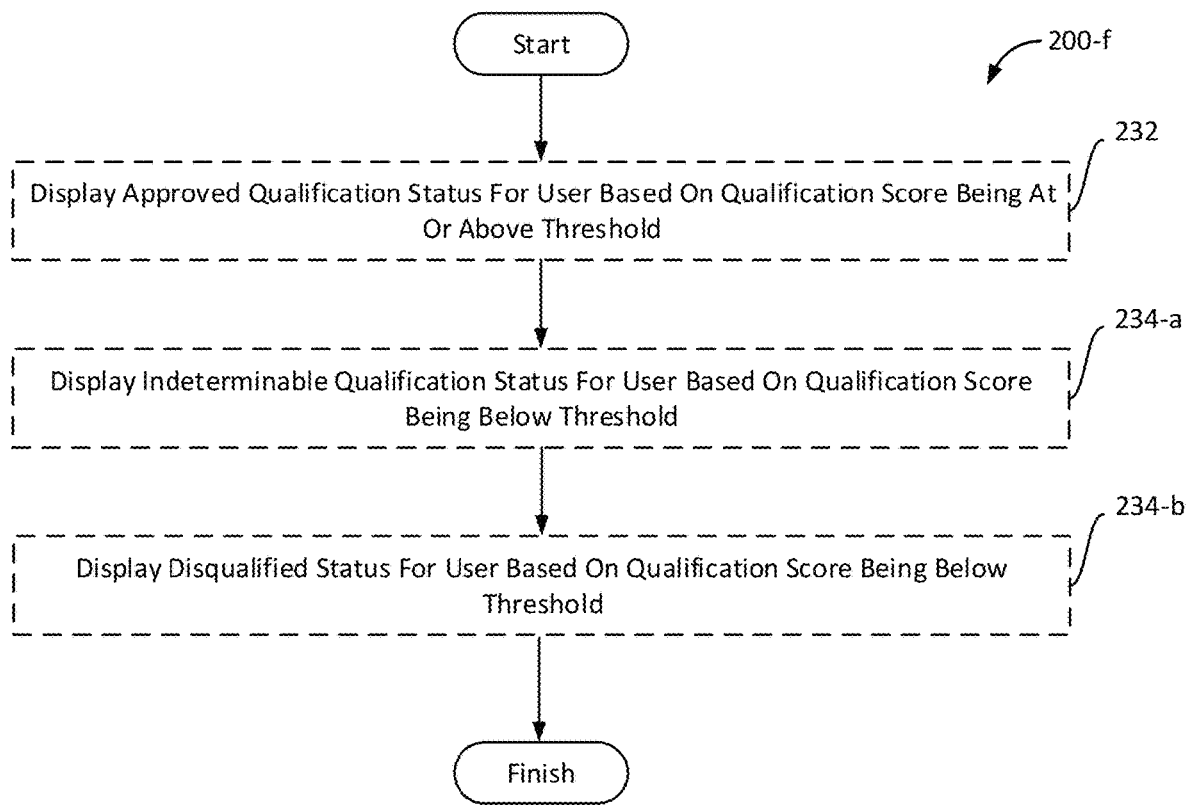

FIG. 2F illustrates method 200-*f*, in accordance with one or more implementations. In some cases, method 200-*f* may comprise performing only one of the operations 232 or 234 (as indicated by the dashed lines).

An operation 232 may include displaying an approved qualification status for the user based on the qualification score being at or above a threshold. Operation 232 may be performed by one or more hardware processors configured by machine-readable instructions including a module that is the same as or similar to qualification status display module 134, in accordance with one or more implementations.

Alternatively, an operation 234-*a* may include displaying an indeterminable qualification status for the user based on the qualification score being below the threshold. Operation 234-*a* may be performed by one or more hardware processors configured by machine-readable instructions including a module that is the same as or similar to qualification status display module 134, in accordance with one or more implementations.

In some other cases, an operation 234-*b* may include displaying a disqualified status for the user based on the qualification score being below the threshold. Operation 234-*b* may be performed by one or more hardware processors configured by machine-readable instructions including a module that is the same as or similar to qualification status display module 134, in accordance with one or more implementations. It should be noted that, the indeterminable qualification status displayed in operation 234-*b* may be updated to one of the approved or the disqualified status, for instance, based on analyzing one or more supporting documents uploaded by the user, further described in relation to FIG. 2G.

Figure 2G:
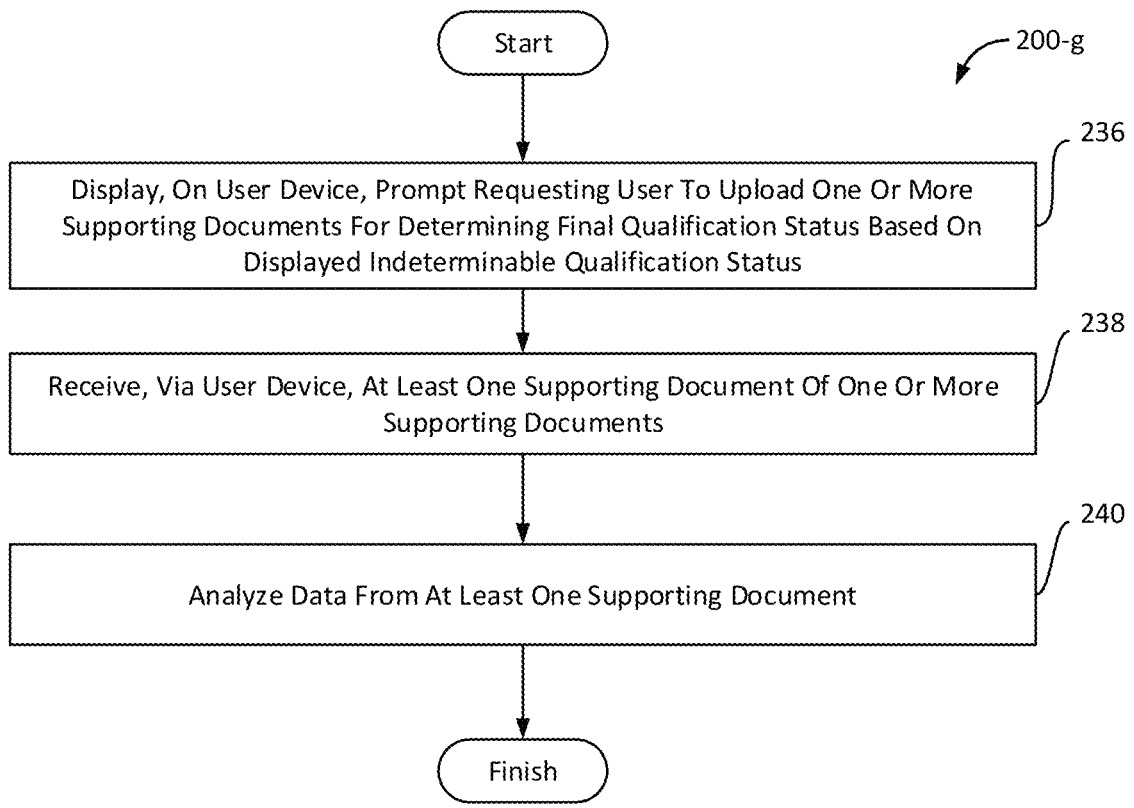

FIG. 2G illustrates method 200-g, in accordance with one or more implementations.

A first operation 236 may include displaying, on the user device, a prompt requesting the user to upload one or more supporting documents for determining a final qualification status based on the displayed indeterminable qualification status. First operation 236 may be performed by one or more hardware processors configured by machine-readable instructions including a module that is the same as or similar to upload module 136, in accordance with one or more implementations.

A second operation 238 may include receiving, via the user device, at least one supporting document of the one or more supporting documents. Operation 238 may be performed by one or more hardware processors configured by machine-readable instructions including a module that is the same as or similar to supporting document module 138, in accordance with one or more implementations.

A third operation 240 may include analyzing data from the at least one supporting document. The analyzing may include one or more of parsing textual information, optical character recognition, and image recognition. Third operation 240 may be performed by one or more hardware processors configured by machine-readable instructions including a module that is the same as or similar to data analysis module 140, in accordance with one or more implementations.

Figure 2H:
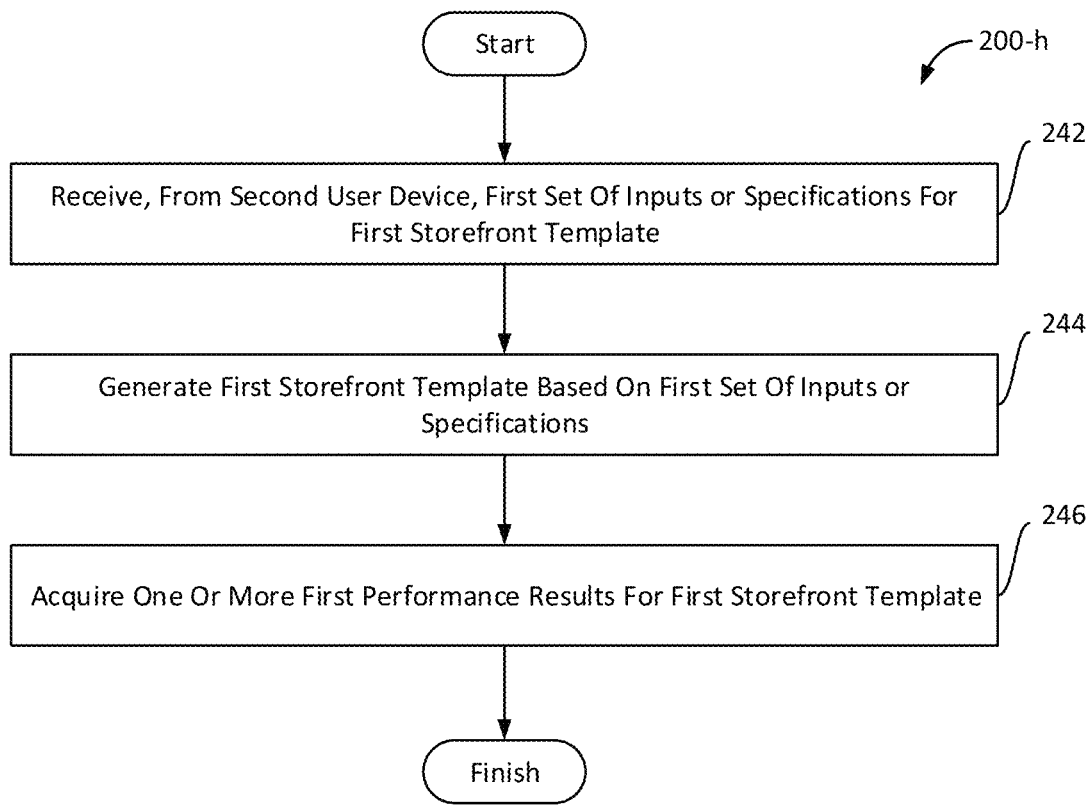

FIG. 2H illustrates method 200-h, in accordance with one or more implementations.

A first operation 242 may include receiving, from a second user device or an administrator device, a first set of specifications and/or inputs for the first virtual storefront template. The second user device may be associated with a contractor. First operation 242 may be performed by one or more hardware processors configured by machine-readable instructions including a module that is the same as or similar to set receiving module 142, in accordance with one or more implementations.

A second operation 244 may include generating the first virtual storefront template based on the first set of specifications and/or inputs. Second operation 244 may be performed by one or more hardware processors configured by machine-readable instructions including a module that is the same as or similar to virtual storefront template generating module 144, in accordance with one or more implementations.

A third operation 246 may include acquiring one or more first performance parameters (also referred to as first performance results) for the first virtual storefront template. In some cases, acquiring one or more first performance results for the first virtual storefront template may comprise acquiring one or more performance results for a first virtual storefront (or storefront UI) generated from the first virtual storefront template. Third operation 246 may be performed by one or more hardware processors configured by machine-readable instructions including a module that is the same as or similar to performance parameter acquiring module 146, in accordance with one or more implementations.

Figure 2I:
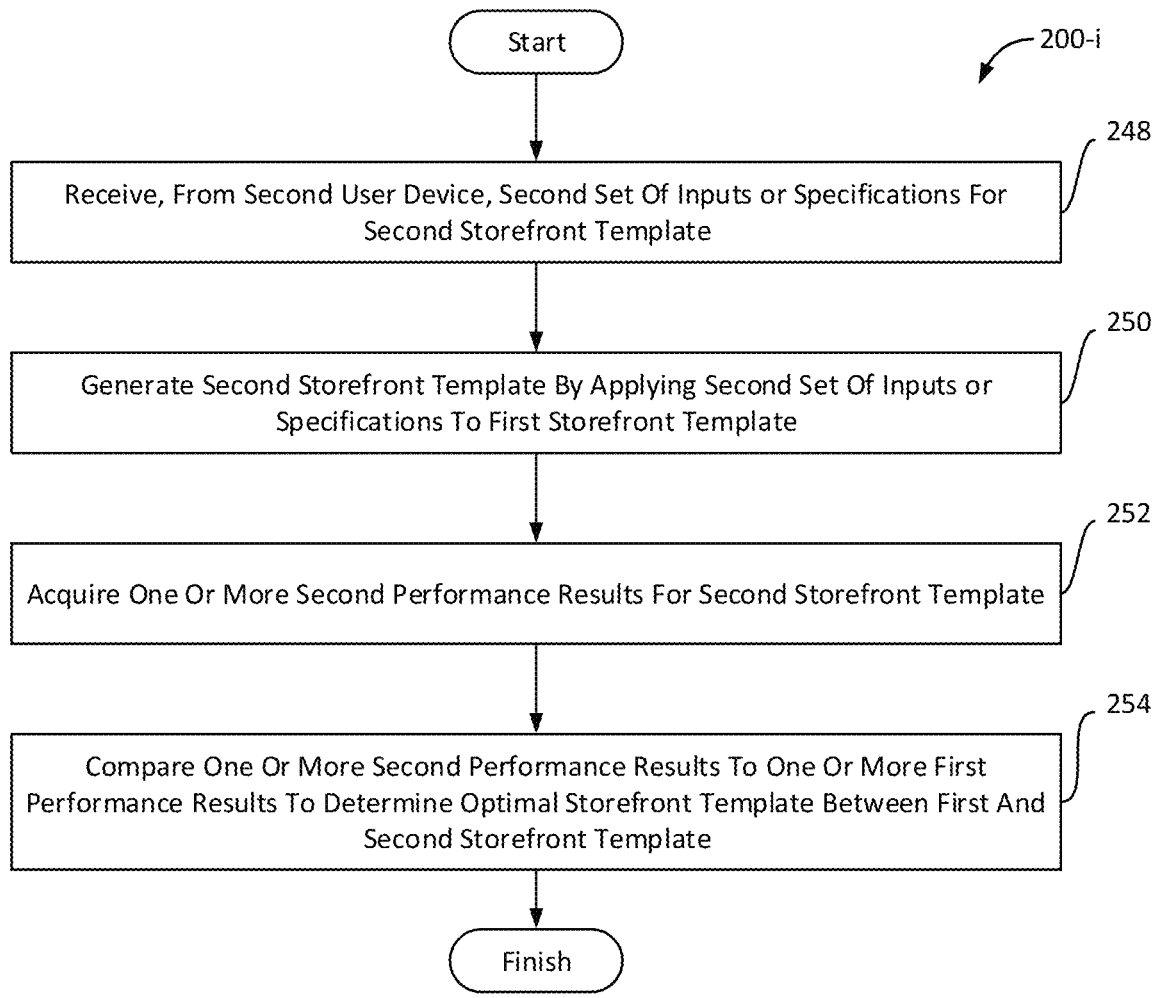

FIG. 2I illustrates method 200-i, in accordance with one or more implementations.

In some cases, the optimization engine (also referred to as experiments module) for virtual storefront templates (e.g., shown as experiments module 601 in FIG. 6) may be configured to receive one or more specifications and/or inputs regarding a new virtual storefront template from a contractor or system administrator. In some cases, the new virtual storefront template (also referred to as a sister virtual storefront template) may be generated by applying the new template specifications and/or inputs to an existing virtual storefront template. In some examples, the existing virtual storefront template may have been previously created by the contractor, or alternatively, recommended by the system. Some aspects of the present disclosure relate to an optimization engine or experiments module for virtual storefront templates. A contractor or service provider may utilize the optimization engine to optimize the look and feel of their virtual storefront template, which may serve to enhance customer acquisition. In some circumstances, a contractor may either lack the knowledge and/or skills to generate a virtual storefront template that is not only appealing (e.g., in aesthetics, provides an enhanced user experience) to customers, but also easily accessible from different platforms (e.g., smartphones, laptops, different operating systems, such as Windows, Linux, Mac OS, etc.). Additionally, even if the contractor were competent in generating a storefront/website for their online business, it may not be readily apparent what is the most optimal format, presentation, type of information to present, etc., to enhance customer intent to purchase, new customer acquisition, generating leads, and/or revenue, to name a few non-limiting examples. According to aspects of this disclosure, the optimization engine or experimentation module may be configured to not only provide a platform for contractors to gauge the performance of their existing virtual storefront template with respect to a new virtual storefront template, but also provide virtual storefront template suggestions based on virtual storefront templates utilized by other contractors. In some instances, the system may be configured to monitor qualitative and quantitative metrics (e.g., leads generated, revenue, conversion rate, etc.) of storefronts (i.e., generated from a plurality of virtual storefront templates) across a plurality of contractors simultaneously. Further, the confluence of the data from one or more other storefronts may be used to optimize a first client or contractor's storefront when the data from the first client alone is insufficient, as an example. Thus, the ability to leverage the data of the group (e.g., all contractors in the solar panel installation business; a plurality of contractors in a certain geographic region, such as the Midwest; a plurality of contractors selling products/services at the same or similar price point, for instance, $9-12/watt, to name a few non-limiting examples) may serve to enhance the customer acquisition process for one or more contractors using the system of the present disclosure.

In some embodiments, a first operation 248 may include receiving, from the second user device or administrator device, a second set of specifications and/or inputs for a second virtual storefront template (also referred to as a second storefront template or "a sister storefront template") associated with the first product or contractor. In some other cases, the second virtual storefront template may also be referred to as a "challenger" storefront template or a competing variation of the first storefront template. First operation 248 may be performed by one or more hardware processors configured by machine-readable instructions including a module that is the same as or similar to set receiving module 142, in accordance with one or more implementations.

A second operation 250 may include generating the second virtual storefront template by applying the second set of specifications and/or inputs to the first virtual storefront template. Second operation 250 may be performed by one or more hardware processors configured by machine-readable instructions including a module that is the same as or similar to virtual storefront template generating module 144, in accordance with one or more implementations.

A third operation 252 may include acquiring one or more second performance results for the second virtual storefront template. In some cases, acquiring one or more second performance results for the second virtual storefront template may comprise acquiring one or more performance results for at least one virtual storefront (or storefront UI) generated from the second virtual storefront template. Third operation 252 may be performed by one or more hardware processors configured by machine-readable instructions including a module that is the same as or similar to performance parameter acquiring module 146, in accordance with one or more implementations.

A fourth operation 254 may include comparing the one or more second performance results to the one or more first performance results to determine an optimal virtual storefront template between the first and the second virtual storefront template. In some cases, comparing the one or more second performance results to the one or more first performance results may comprise comparing the performance results for the first and second virtual storefront UIs generated from the first and second virtual storefront templates, respectively. Fourth operation 254 may be performed by one or more hardware processors configured by machine-readable instructions including a module that is the same as or similar to performance parameter comparing module 148, in accordance with one or more implementations. It should be noted that the number of virtual storefront templates and/or virtual storefront UIs considered in the optimization experiment is not intended to be limiting, and more than two virtual storefront templates or UIs may be assessed in different embodiments (e.g., see related discussion in FIG. 9).

Figure 2J:
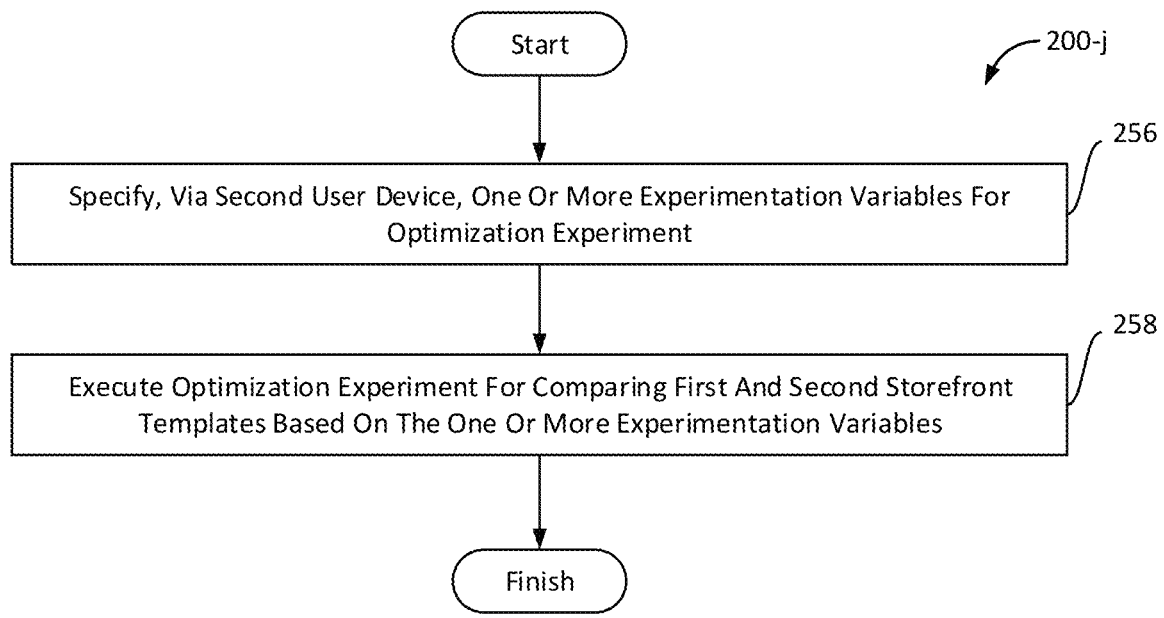

FIG. 2J illustrates method 200-*j*, in accordance with one or more implementations.

A first operation 256 may include specifying, via the second user device, one or more experimentation variables or experimentation parameters for an optimization experiment. The optimization experiment used to compare the first and second virtual storefront templates. The one or more experimentation parameters may include one or more of a traffic split ratio, a test duration, a success criteria, and termination conditions. First operation 256 may be performed by one or more hardware processors configured by machine-readable instructions including a module that is the same as or similar to experimentation variable specification module 150, in accordance with one or more implementations.

A second operation 258 may include executing the optimization experiment for comparing the first and second virtual storefront templates based on the one or more experimentation variables. In some cases, executing the optimization experiment may comprise obtaining split test performance results for the first and second virtual storefront templates. Second operation 258 may be performed by one or more hardware processors configured by machine-readable instructions including a module that is the same as or similar to optimization experiment execution module 152, in accordance with one or more implementations.

Figure 2K:
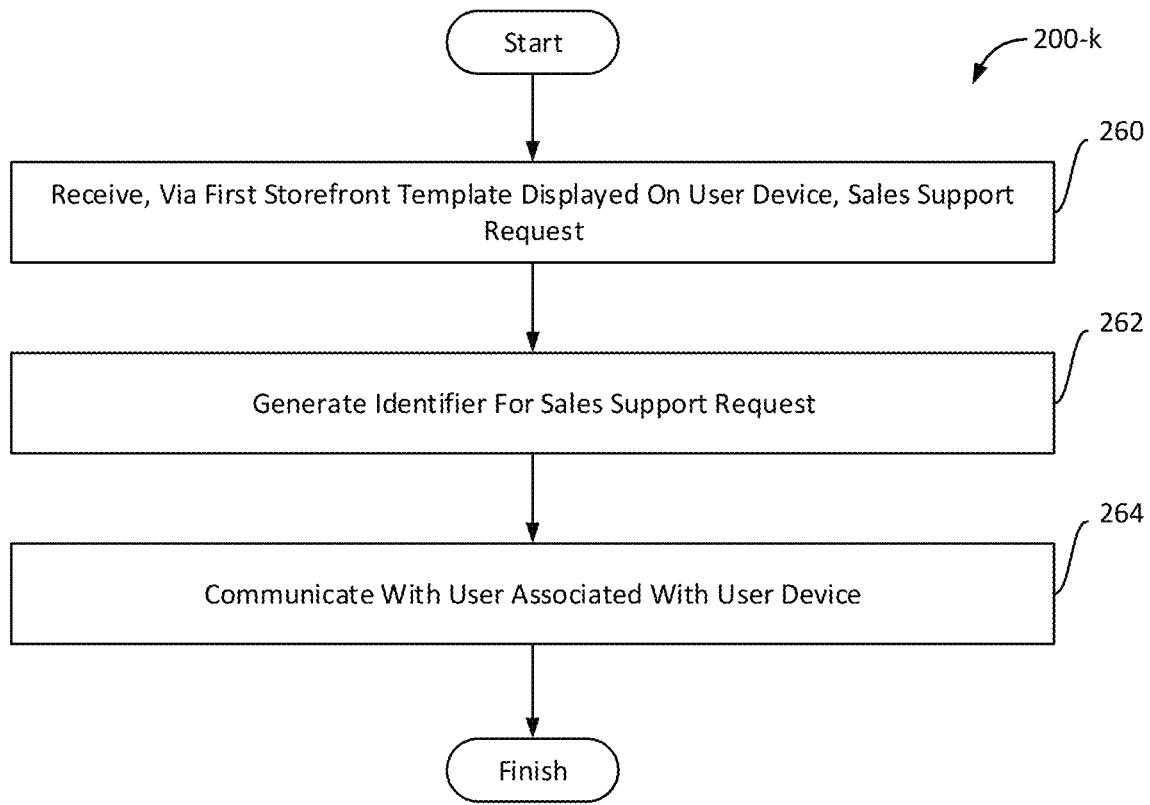

FIG. 2K illustrates method 200-*k*, in accordance with one or more implementations.

A first operation 260 may include receiving, via the first virtual storefront UI displayed on the user device, a sales support request. First operation 260 may be performed by one or more hardware processors configured by machine-readable instructions including a module that is the same as or similar to sale support request receiving module 154, in accordance with one or more implementations.

A second operation 262 may include generating an identifier for the sales support request. Second operation 262 may be performed by one or more hardware processors configured by machine-readable instructions including a module that is the same as or similar to identifier generating module 156, in accordance with one or more implementations.

A third operation 264 may include communicating with the user associated with the user device. The communicating may be based at least in part on a round-robin, first available, or weighted selection method. The communicating may include utilizing the identifier in one or more of a live chat, an internet voice call, a screen sharing session, and an artificial intelligence or natural language processing based communication. Third operation 264 may be performed by one or more hardware processors configured by machine-readable instructions including a module that is the same as or similar to user communication module 158, in accordance with one or more implementations.

Figure 2L:
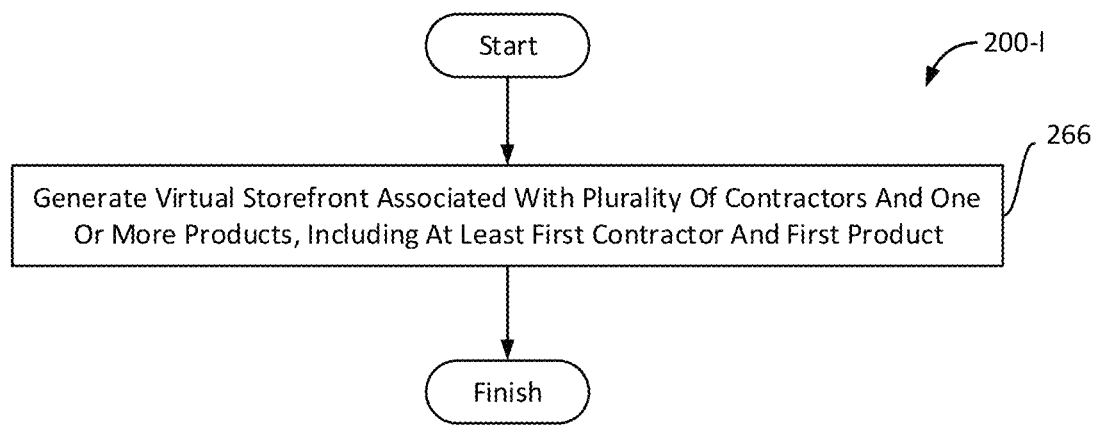
FIG. 2M illustrates a method for generating and optimizing virtual storefront templates, according to an alternate embodiment of the disclosure.

FIG. 2L illustrates method 200-1, in accordance with one or more implementations.

A first operation 266 may include generating a virtual storefront repository associated with a plurality of contractors and a plurality of products, including at least the first contractor and the one or more products. Each of the plurality of products (or services, in some cases) may be linked to a contractor of the plurality of contractors. The virtual storefront repository may be configured to receive one or more of lender criteria data, portal configuration data, contractor preferences data, virtual storefront templates data (e.g., specifications and/or inputs for configuring virtual storefront templates, the virtual storefront templates used to generate storefront UIs), experimentation parameters or variables, geospatial and weather data, property data, and market data. First operation 266 may be performed by one or more hardware processors configured by machine-readable instructions including a module that is the same as or similar to virtual storefront module 160, in accordance with one or more implementations.

Figure 2M:
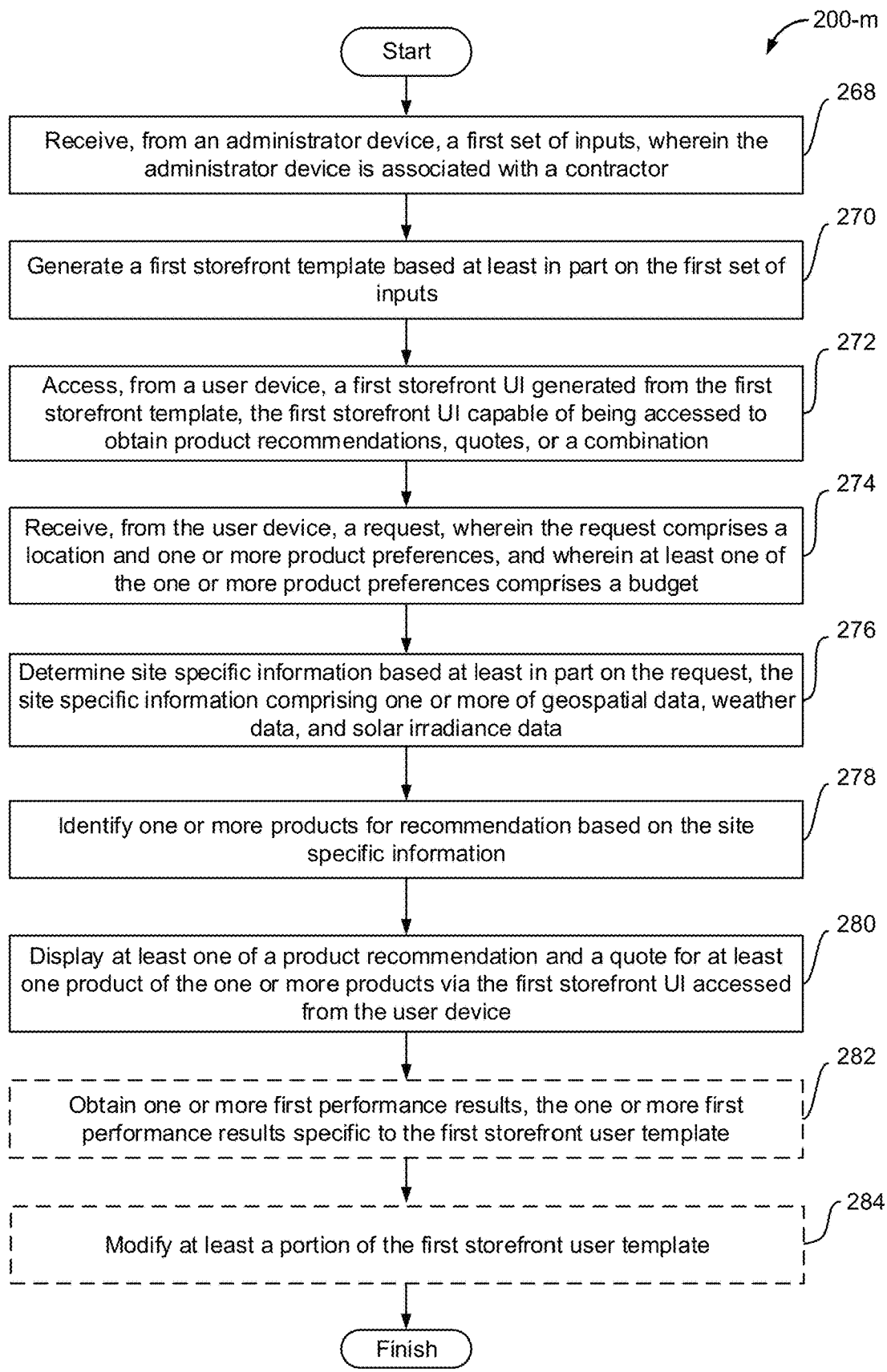

FIG. 2M illustrates a method 200-*m* for optimizing virtual storefront templates, in accordance with one or more implementations. The operations of method 200-*m* presented below are intended to be illustrative. In some implementations, method 200-*m* may be accomplished with one or more additional operations not described, and/or without one or more of the operations discussed. Additionally, the order in which the operations of method 200-*m* are illustrated in FIG. 2M and described below is not intended to be limiting.

In some implementations, method 200-*m* may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200-*m* in response to instructions stored electronically on an electronic storage medium. The one or more processing devices may include one or more devices configured through hardware, firmware, and/or software to be specifically designed for execution of one or more of the operations of method 200-*m*.

A first operation 268 may comprise receiving, from an administrator device, a first set of inputs, wherein the administrator device is associated with a contractor. In some cases, the first set of inputs may be received via a contractor UI (e.g., contractor UI 620 in FIG. 6), for instance, using a storefront setup wizard (e.g., shown as storefront setup wizard 401 in FIG. 4). The first set of inputs may comprise one or more of configuration data for configuring a first virtual storefront template, a per unit product cost input (e.g., dollars per watt, dollars per square foot, etc.) for modeling prices for use in quotes, and/or type of information (e.g., estimated tax savings, estimated energy savings over a predefined duration, such as 5 years, 10 years, etc.) for presenting via a first virtual storefront (or storefront UI) generated from the first virtual storefront template. It should be noted that the information presented via the first virtual storefront UI (discussed above) may be some non-limiting examples of contractor outputs. Other types of contractor outputs are contemplated and described throughout this disclosure.

In some cases, the configuration data may comprise theming or styling related data, for instance, a format and/or layout (e.g., text size, text font, images, location of ads within the virtual storefront template, such as upper left corner, lower right corner, rightmost column, leftmost column, etc.) for the first virtual storefront template. Theming may also determine which elements of the proposal to accentuate, such as cost avoidance, or environmental benefit. Additionally or alternatively, the configuration data may be used to customize user input fields (e.g., required data fields, optional data fields, order in which user input or data fields are presented to user, etc.). The first set of inputs may be used to furnish or generate a virtual storefront template associated with the first contractor. It should be noted that, virtual storefronts (or storefront UIs) generated from the first virtual storefront template may implement the theming or styling from the first virtual storefront template, even though they may display different data (e.g., different product recommendations, quotes, proposals, up-sell or cross-sell product recommendations, etc.). In some non-limiting examples, the virtual storefront template may be embedded as an app in an existing website/platform associated with the contractor, for instance, using Iframe HTML. In other cases, the virtual storefront template may be implemented using a microsite, where the microsite may comprise one or more web pages hosted on a subdomain. It should be noted that the existing website and the microsite may be associated with the same or different domain names.

First operation 268 may be performed by one or more hardware processors configured by machine-readable instructions including a module that is the same as or similar to set receiving module 142, in accordance with one or more implementations. In some cases, first operation 268 may also comprise receiving one or more contractor specified preferences and/or lender criteria data from the contractor. For instance, the contractor may specify a minimum credit score (e.g., 720), a minimum income level (e.g., $100 k), and/or a minimum down payment required if not paying for the product/service in full (e.g., $3 k). In some other cases, the contractor may also specify one or more other binary qualifiers (e.g., potential customer should be a homeowner, not a renter), which may be used to configure the first virtual storefront template.

A second operation 270 may comprise generating a first virtual storefront template based at least in part on the first set of inputs. For instance, the second operation 270 may comprise furnishing (i.e., configuring the format, layout, price input, etc.) the first virtual storefront template. In some cases, data pertaining to the first set of inputs and/or the first virtual storefront template may be stored in a database (e.g., database 607-d in FIG. 6 storing virtual storefront templates information) electronically and communicatively coupled to a virtual storefront system (e.g., shown as system 100 in FIG. 1; virtual storefront system or repository 610 in FIG. 6). The database 607-d may also store data pertaining to one or more other virtual storefront templates (i.e., for the same or different contractor(s)). In some cases, the one or more contractor specified preferences and/or lender criteria data may also be stored in databases (e.g., database 607-a for lender criteria data, database 607-c for contractor specified preferences, further described in relation to FIG. 6) in electronic communication with the virtual storefront system or repository 610. Second operation 270 may be performed by one or more hardware processors configured by machine-readable instructions including a module that is the same as or similar to virtual storefront template generating module 144, in accordance with one or more implementations.

A third operation 272 may comprise accessing, from a user device, a first virtual storefront or storefront UI, the first virtual storefront capable of being accessed to obtain product recommendations, quotes, or a combination thereof. For instance, a user or potential customer accessing a storefront UI (e.g., storefront UI 625 in FIG. 6) associated with the contractor may be displayed the first virtual storefront generated from the first virtual storefront template. The theming/styling of the first virtual storefront, amongst other aspects (e.g., mandatory user input fields, location of ads, etc.) may be based in part on (or derived from) the first virtual storefront template. As described above, a virtual storefront template may refer to a template for building or generating one or more virtual storefronts or storefront UIs. In some cases, a virtual storefront template may comprise information pertaining to one or more of a layout, look, feel, data to be presented, etc., for one or more virtual storefronts generated from the storefront template. In other words, a virtual storefront or storefront UI may refer to a singular user interface accessed by a customer (e.g., a homeowner), and generated from the virtual storefront template. Further, different storefront UIs (e.g., comprising different data, such as product recommendations, quotes, proposals, etc.) having the same or similar layout/look/feel, etc., may be generated from the same virtual storefront template and displayed to different customers, in some embodiments.

In some cases, the storefront UI may comprise a website, mobile app, or any other applicable UI platform (e.g., a kiosk in a home improvements store). The user device (e.g., user device 605-b in FIG. 6) may be configured to transmit/receive information from the virtual storefront system over a network (e.g., a wired or wireless network), for instance, via an API. Third operation 272 may be performed by one or more hardware processors configured by machine-readable instructions including a module that is the same as or similar to user template accessing module 120, in accordance with one or more implementations.

A fourth operation 274 may comprise receiving, from the user device, a request, wherein the request comprises a location and one or more product preferences. In some cases, the request may comprise one or more of a product recommendation request (e.g., for receiving a recommendation for solar panels, an inverter, a battery or power pack, smart thermostat, energy efficient lighting, electric vehicle, etc.) and a quote request (e.g., for receiving a solar quote). Fourth operation 274 may be performed by one or more hardware processors configured by machine-readable instructions including a module that is the same as or similar to product recommendation request receiving module 142, in accordance with one or more implementations.

A fifth operation 276 may comprise determining site specific information based at least in part on the request, the site specific information comprising one or more of geospatial data, weather data, and solar irradiance data. Fifth operation 276 may be performed by one or more hardware processors configured by machine-readable instructions including a module that is the same as or similar to site information determination module 112, in accordance with one or more implementations. In some cases, at least a portion of the site specific information may be obtained from one or more third party sources (e.g., GOOGLE MAPS, BING MAPS, Weather sources, such as National Weather Service, etc.). In some other cases, the site specific information may be obtained from one or more databases (e.g., database 607-*f* storing geospatial and weather data). In some cases, a product recommendation and/or quoting engine (e.g., shown as product recommendation and quoting engine 606 in FIG. 6) may utilize this site specific information obtained from the one or more databases and/or third party sources to identity one or more products for recommendation and generate a quote for the one or more products. In some cases, the product recommendation and quoting engine may be associated with a third party. Alternatively, the product recommendation and quoting engine may be a part of the virtual storefront system (e.g., virtual storefront system/repository 610 in FIG. 6).

A sixth operation 278 may comprise identifying one or more products for recommendation based on the site specific information. Sixth operation 278 may be performed by one or more hardware processors configured by machine-readable instructions including a module that is the same as or similar to product identifying module 114, in accordance with one or more implementations. Additionally or alternatively, sixth operation 278 may be performed by one or more hardware processors configured by machine-readable instructions including a module that is the same as or similar to contractor preference identifying module 124, in accordance with one or more implementations. In yet other cases, sixth operation 278 may be performed by one or more hardware processors configured by machine-readable instructions including a module that is the same as or similar to product determination module 128, in accordance with one or more implementations.

A seventh operation 280 may comprise displaying at least one of a product recommendation and a quote for at least one product of the one or more products via the first virtual storefront UI accessed from the user device. In some cases, the first virtual storefront UI may be generated from the first virtual storefront template. Seventh operation 280 may be performed by one or more hardware processors configured by machine-readable instructions including a module that is the same as or similar to quote display module 118, in accordance with one or more implementations. Additionally or alternatively, seventh operation 280 may be performed by one or more hardware processors configured by machine-readable instructions including a module that is the same as or similar to quote generating module 116, in accordance with one or more implementations.

An eighth operation 282 (shown as optional by the dashed lines) may comprise obtaining one or more first performance results, the one or more first performance results specific to the first virtual storefront template. In some cases, obtaining the one or more first performance results may comprise obtaining performance results for at least one virtual storefront UI generated from the first virtual storefront template. Eighth operation 282 may be performed by one or more hardware processors configured by machine-readable instructions including a module that is the same as or similar to performance parameter acquiring module 146, in accordance with one or more implementations.

A ninth operation 284 (shown as optional by the dashed lines) may comprise modifying at least a portion of the first virtual storefront template. In some cases, the modification may be based in part on analyzing the one or more first performance results. Alternatively, at least a portion of the first virtual storefront template may be modified in absence of any performance results (e.g., autonomously by an experimentation or storefront/optimization testing engine, such as storefront experimentation engine 601 in FIG. 6). In yet other cases, the modification may be based in part on analyzing performance results for one or more other virtual storefront templates associated with one or more other contractors. For instance, the modification may be based in part on analyzing performance results for one or more virtual storefront UIs generated from the one or more other virtual storefront templates. In some cases, the modifying may comprise utilizing a different configuration (e.g., a visual format or layout), displaying different data or types of information, further described in relation to FIGS. 6-9, and/or utilizing different inputs (e.g., a price input for modeling prices, where the price input may comprise a dollar/watt), to name a few non-limiting examples. In some cases, the configuration data for the modified virtual storefront template may be stored to the virtual storefront templates database (e.g., shown as database 607-*d* in FIG. 6). In some cases, the modified first virtual storefront template (i.e., a second virtual storefront template) may temporarily replace the first virtual storefront template, which may enable the contractor to compare performance results for the two virtual storefront templates. In some cases, a second virtual storefront or storefront UI may be generated from the second virtual storefront template. In such cases, users or potential customers accessing the storefront associated with the contractor may now be displayed the second virtual storefront UI, instead of the original first virtual storefront UI, which may allow the contractor to assess enhancements, if any, provided by the second or modified virtual storefront template. The enhancements may comprise one or more of a revenue or profit, leads generated, click-through-rate, return on advertising spend (ROAS), and a lead to conversion rate, to name a few non-limiting examples.

In some other cases, an optimization experiment may be set up and executed to compare performance results for the two virtual storefront UIs (i.e., generated from different virtual storefront templates), for instance, to determine an optimal virtual storefront template for a given set of inputs (e.g., location, income range, age range, traffic source etc.). In some cases, the optimal virtual storefront template may also be referred to as a winning or champion storefront template. It should be noted that, this optimal storefront template may be challenged by (i.e., compared to) another virtual storefront template in the future, and may be replaced by the other virtual storefront template. In some cases, the contractor or a system administrator may specify one or more experimentation variables or parameters, such as a traffic split ratio, a test duration, etc., for use in the optimization experiment, further described in relation to FIG. 9. Ninth operation 284 may be performed by one or more hardware processors configured by machine-readable instructions including one or more modules that are the same as or similar to set receiving module 142, virtual storefront template generating module 144, performance parameter acquiring module 146, performance parameter comparing module 148, experimentation variable specification module 150, virtual storefront module 160, and/or optimization experiment execution module 152, in accordance with one or more implementations.

Figure 3:
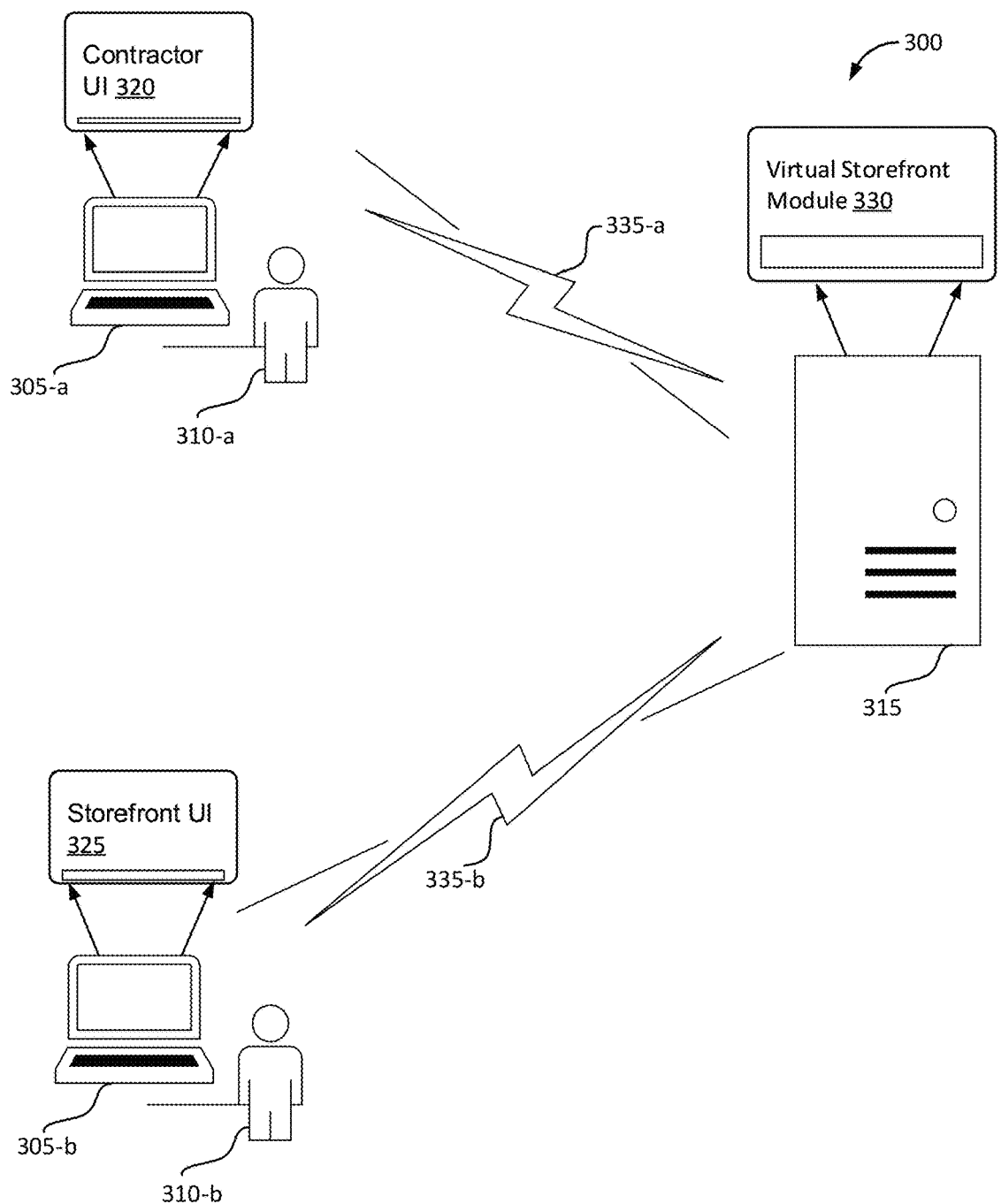
FIG. 3 illustrates a system configured for generating and optimizing virtual storefront templates, according to an embodiment of the disclosure.

FIG. 3 illustrates a system 300 configured for optimizing customer acquisition and/or virtual storefront templates, according to an aspect of the disclosure. As seen, system 300 comprises a server 315, one or more user devices 305 (e.g., user device 305-a, user device 305-b), and one or more communication links 335 (e.g., communication links 335-a, 335-b) between the user devices 305 and the server 315. In some embodiments, server 315 may comprise or may be used to host a virtual storefront module 330 (also referred to as virtual storefront system 330). The virtual storefront module 330 may be the same as or similar to the virtual storefront module 160 in FIG. 1, or alternatively, may implement one or more aspects of the virtual storefront template generating module 144, virtual storefront module 160, or any other module described in relation to FIG. 1. As shown, user device 305-a may be associated with user 310-a (e.g., a contractor or service provider), while user device 305-b may be associated with user 310-b (e.g., a potential customer). In some cases, the user device 305-a may also be referred to as a contractor device or an administrator device to differentiate from the user device 305-a used by a customer (e.g., new or existing customer). In some cases, the virtual storefront module 330 may be configured to be dynamic and adaptable. For instance, the virtual storefront module 330 may be configured to modify its behavior and outputs based on data accessed from one or more sources, including, but not limited to, one or more databases electronically and communicatively coupled to the server 315. In some cases, the storefront UI 325 displayed on the user device 305-b may be linked to the virtual storefront module 330, and different outputs of the virtual storefront module 330 may manifest themselves as different storefront UIs displayed to different users, further described in relation to FIG. 7. In some examples, the storefront UI 325 may be generated from a virtual storefront template. Further, the storefront UI (e.g., storefront UI 725-a in FIG. 7) displayed to a first user or customer may be different from a storefront UI (e.g., storefront UI 725-b) displayed to a second, different user or customer, even though both storefront UIs are linked to the same contractor. According to aspects of this disclosure, a storefront UI may work in conjunction with (or replace) an existing interface (e.g., website, or another UI) utilized by a contractor. Besides displaying different data (e.g., product recommendations, quotes, proposals, etc.), the storefront UIs displayed to different customers may also be generated from different virtual storefront templates.

In some cases, the system of the present disclosure may provide contractors with an API, where the API may be used to make API calls to the virtual storefront module 330 hosted on server 315. In some cases, the API may be integrated with an existing platform or website associated with a contractor. The API may enable the contractor to utilize the functionality (e.g., virtual storefront template optimization) provided by the system of the present disclosure, for instance, by connecting the contractor's platform or website to the virtual storefront module 330 via the API. In other words, a user or potential customer may now interact with the virtual storefront module 330 hosted on the server 315, instead of a server (not shown) previously used to host the contractor's website. Further, the virtual storefront module 330 and/or the server 315 may respond to the API call with data pertaining to one or more of: virtual storefront template configuration data for configuring the virtual storefront UI displayed to the user, information (e.g., product recommendation, quote, etc.) for presenting via the virtual storefront, qualification status data for the user, and/or experimentation data to name a few non-limiting examples. In some cases, the response to the API calls may be used to configure the storefront UI accessed from the user device 305-b. For instance, the response to the API calls may be used to generate the storefront UI (e.g., by populating one or more fields in the virtual storefront template). Additionally or alternatively, the response to the API calls may be presented to the contractor via the contractor UI 320, for instance, if the response pertains to experimentation data obtained from comparing performance results for two or more virtual storefront templates. In some cases, the virtual storefront module 330 and/or server 315 may be linked to the server (not shown) used to host the contractor's website or platform from which it may receive information (e.g., contractor specified preferences, billing and payments information, etc.).

In some circumstances, the storefront UI 325 may be displayed within a website or application of the current system (e.g., a website within a website). Alternatively, the system 300 may generate an app (e.g., mobile app, web app) for use by a contractor, where the app may be embedded within an existing website or platform associated with the contractor, for instance, using Iframes. In some cases, the embeddable app may be generated based on contractor input (e.g., received via storefront setup wizard 401 in FIG. 4), and may be used to display the storefront UI. Thus, in some aspects, the embeddable app may allow user's arriving at the contractor's website to access the virtual storefront UI (i.e., storefront UI 325) generated by the system 300. In some examples, one or more portions of the app may be customizable by the contractor.

In other cases, the storefront UI 325 may be displayed by way of a microsite. A microsite refers to an individual web page or a cluster of web pages that are designed to function as a discrete entity within an existing website. In some cases, a microsite may be associated with its own domain name or subdomain. For instance, the contractor's website may be associated with a first domain name (e.g., www.contractor.com), while the microsite may be associated with a second different domain (e.g., www.demandiq.com) or alternatively, a subdomain of the first domain (e.g., www.virtual-contractor.com). In one non-limiting example, the microsite may be associated with a domain name or a subdomain associated with the system 300.

Figure 4:
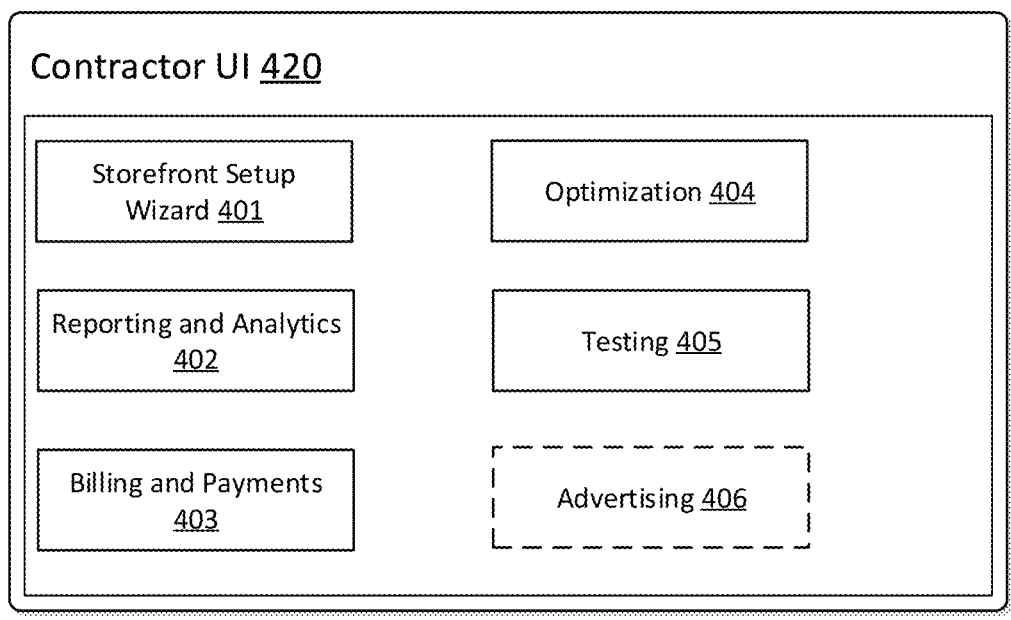
FIG. 4 illustrates a business-to-business (B2B) system configured for generating and optimizing virtual storefront templates, according to an embodiment of the disclosure.

FIG. 4 illustrates an example of a B2B system 400 according to an aspect of the disclosure. As shown, B2B system 400 comprises a contractor UI 420, which may be similar or substantially similar to the contractor UI 320 described in relation to FIG. 3. In some cases, contractor UI 420 may comprise one or tabs and may be displayed on a user device associated with the contractor (e.g., user device 305-a in FIG. 3). Some non-limiting examples of tabs may include storefront setup wizard 401, reporting and analytics 402, billing and payments 403, optimization 404, testing 405, and advertising 406. In some examples, the contractor UI 420 may also be referred to as a portal. In some cases, the optimization and testing tabs may be displayed as a single tab (e.g., experiments tab).

In some examples, a contractor or service provider may utilize B2B system 400 to generate at least one B2C virtual storefront UI (or simply, storefront UI) that will be displayed to new or existing customers. For example, the contractor may utilize the storefront setup wizard 401 to configure at least one virtual storefront template, where the virtual storefront template may be used to generate a virtual storefront (or storefront UI). In some cases, the virtual storefront may be displayed to the user. In some embodiments, the contractor may provide one or more of a lender criteria and contractor specific preferences via the contractor UI 420. These may be stored in one or more databases in electronic communication with the virtual storefront module (or the server hosting the virtual storefront module, such as virtual storefront module 630 in FIG. 6). In some cases, the contractor UI 420 may also display one or more of: reporting and analytics data, billing and payments data, optimization/testing data (also referred to as experiments data), and advertising data specific to the contractor. In some aspects, the storefront UI may serve as a gateway for the contractor's business since new customers may sign up for the contractor's services through the storefront UI.

In some cases, the storefront setup wizard 401 may allow the contractor to configure their online storefront, which may include one or more of: specifying what data is presented to customers, how data is presented to customers, theming and styling information (e.g., text size/format), images displayed on the storefront UI, input fields for receiving user input, including an indication of which fields are required (e.g., address, name, phone number) and which are optional (e.g., alternate phone number), etc. In essence, the storefront setup wizard 401 allows the contractor to customize the storefront that will be displayed to the customers. In some circumstances, a contractor may have minimal knowledge on how to deploy their business online, especially with regards to UI and UX. On the other hand, the aesthetics and UX of a storefront UI may be crucial for some, if not all, customers. A contractor having a clunky and less than aesthetic storefront UI (e.g., a website) may lose potential customers to another contractor having a more aesthetically pleasing website or storefront UI, even though the quality and level of service provided by the contractor is comparable or superior to the other contractor. In some aspects, the present disclosure allows contractors to focus on their strengths (e.g., providing a high quality solar panel installation service) and leave the aspects of customer acquisition, customer service, product recommendation and quoting, digital marketing, etc., to the system of the present disclosure.

In some cases, a contractor, such as user 310-a in FIG. 3, may utilize the contractor UI 420 to not only configure storefront UIs displayed to customers, but also manage other aspects of their online business. For instance, the contractor may view reporting and analytics related information for their business (e.g., revenue per storefront, number of new customers acquired, revenue generated per customer, etc.) in the reporting and analytics tab 402. In the billing and payments tab 403, the contractor may view billing and payments information for all their customers (e.g., payments received, pending payments, credit card or other payment information on file, etc.). Through the optimization tab 404, the contractor may optimize the storefront UIs displayed to customers, including the information presented to customers, format the information is presented in, what information is emphasized or focused on, etc. Additionally, through the testing tab 405, the contractor may set up optimization experiments or tests for different storefront versions to assess their performance with regards to one or more key metrics. Some non-limiting examples of key metrics may include leads generated per storefront, revenue per storefront, new customers acquired per storefront, lead to conversion rate per store front, loading failures or glitches per storefront, etc.

In the advertising tab 406 (shown as optional by the dashed lines), the contractor may configure one or more of: advertisements from 3rd party companies displayed on their storefront UI and/or their advertisements displayed on storefronts associated with other contractors (e.g., a solar panel installation contractor may wish to have their advertisements displayed on a re-roofing contractor's storefront UI or a contractor in the battery pack/energy storage unit business). In some cases, the advertising tab 406 may also allow a contractor to purchase advertising space on one or more publishing platforms (e.g., news websites, such as NY Times; social media sites, such as Facebook; search engines, such as Google, Bing, etc.). In such cases, users or customers may be redirected from the publishing platform (e.g., after clicking an ad) to the virtual storefront UI associated with the contractor. The advertising tab 406 may also provide advertising information, such as revenue received from ads, click-through-rates (CTR), demographic information pertaining to users who clicked on ads (e.g., 3rd party ads on their storefront, their ads on another storefront), to name a few non-limiting examples.

Figure 5:
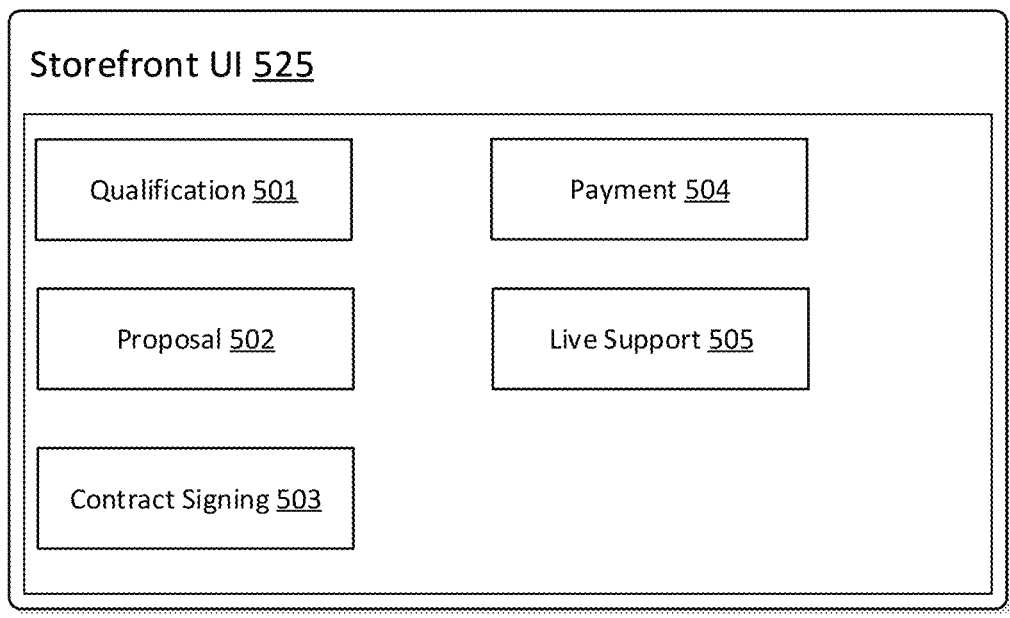
FIG. 5 illustrates a business-to-consumer (B2C) system configured for generating and optimizing virtual storefront templates, according to an embodiment of the disclosure.

FIG. 5 illustrates a B2C system 500 according to an aspect of the disclosure. In some cases, B2C system may comprise a virtual storefront UI 525 (or simply, storefront UI 525), which may be similar or substantially similar to the storefront UIs 325 and 725 described in relation to FIGS. 3 and 7, respectively. In some cases, a potential customer in the market for a product or a service (e.g., solar panel installation) may access the storefront UI 525 to one or more of: get qualified or prequalified, receive a sales proposal (e.g., sales pitch, product recommendation, quote), sign a contract, make a payment, and receive live sales support. In some cases, the live sales support may be provided by a human. Additionally or alternatively, the live sales support may be provided by an AI sales support engine utilizing a Natural Language Processing (NLP) or Machine Learning (ML) algorithm.

As shown, the storefront UI 525 may display one or more tabs, such as a qualification tab 501, a proposal tab 502, a contract signing tab 503, a payment tab 504, and a live support tab 505. In some cases, a user or customer may click through the different modules as they are proceeding through the application process (e.g., first qualification, next proposal, then contract signing, and then payment). The live support tab 505 may be available to the user regardless of which step of the application process they are in. For instance, a user having questions regarding the qualification or pre-qualification process may click on the live support tab 505 to chat with a virtual agent (e.g., NLP based) or a human operator. However, the payment tab 504 may not be displayed to the user until one or more of the intermediate steps, such as qualification, proposal generation, and contract signing, has been completed by the user. In some cases, the storefront UIs displayed to different users may only vary for a portion of the tabs (e.g., proposal tab 502), while the remainder of the modules may be relatively consistent. As noted above, the storefront UI 525 may be auto-generated by the system (e.g., based on storefronts of other contractors in the same or similar line of business), configured by the contractor via the storefront setup wizard, or a combination thereof. In either case, the system 500 may be configured to continuously track the performance of numerous storefronts for multiple contractors and provide personalized recommendations to a contractor to enhance their online presence.

Since the number of storefront UI variations could number in the hundreds or even thousands, without it being apparent which is the most optimal storefront UI, a contractor may simply not have the time, resources, or even knowledge to keep testing different storefront designs until an optimal one is found.

In some circumstances, the virtual storefront UI 525 may be displayed within an existing website or platform associated with a contractor (e.g., as an embedded app using IFrames). In other cases, the virtual storefront UI 525 may be implemented as a microsite and may serve to replace an existing interface accessed by customers (e.g., new, existing customers) when they arrive at the contractor's website or platform. As noted above, the storefront UI 525 may be generated from a virtual storefront template based on information received from a server hosting the virtual storefront module. The server hosting the virtual storefront module may determine the information for configuring the virtual storefront template based on contractor input received via a storefront setup wizard or any other applicable information (e.g., virtual storefront template configuration information for one or more other contractors). In some examples, the storefront template configuration information may comprise Hypertext Markup Language (HTML) and/or Cascading Style Sheets (CSS), to name two non-limiting examples.

Figure 6:
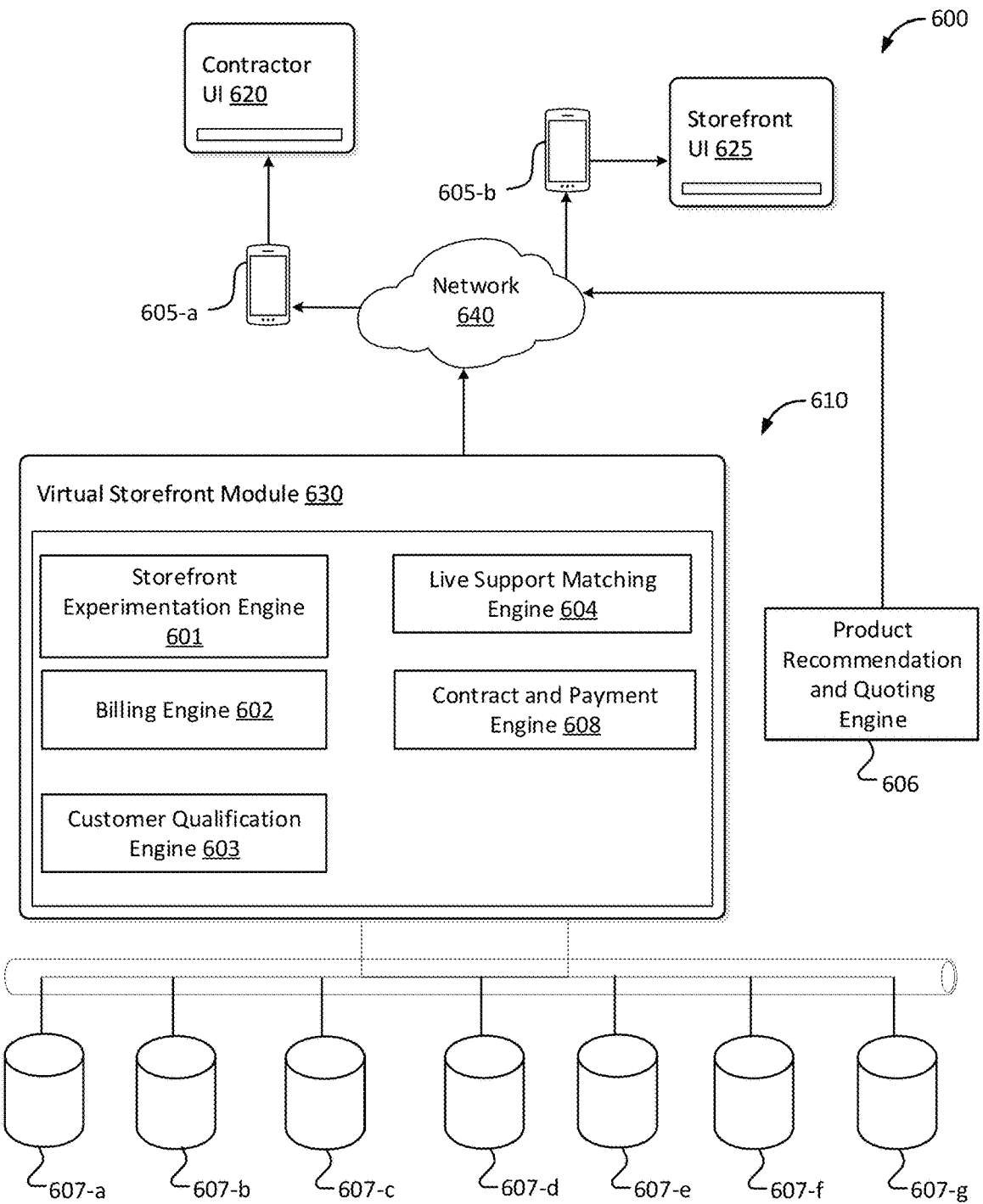
FIG. 6 illustrates a system having a virtual storefront repository, according to an embodiment of the disclosure.

FIG. 6 illustrates a system 600 having a virtual storefront system/repository 610, according to an embodiment of the disclosure. In some examples, system 600 implements one or more aspects of the other systems described herein, including, but not limited to system 100, system 300, system 700, and/or system 800, described in relation to FIGS. 1, 3, 7, and/or 8 respectively. As shown, system 600 comprises a contractor UI 620 (e.g., displayed via user device 605-a), a storefront UI 625 (e.g., displayed via user device 605-b), a network 640, a product recommendation and quoting engine 606, and a virtual storefront module 630, where the virtual storefront module 630 implements one or more aspects of the virtual storefront template generating module 144 and/or virtual storefront module 160 in FIG. 1. Further, the virtual storefront system/repository 610 may comprise one or more of the virtual storefront module 630, databases 607-a-g, and the product recommendation and quoting engine 606. In some embodiments, the virtual storefront system/repository 610 may be associated with a plurality of contractors and a plurality of products, including at least a first contractor associated with the contractor UI 620, storefront UI 625, and/or the user device 605-a. In some cases, the first contractor may be associated with one or more products/services, as described herein and elsewhere in the disclosure. Each of the plurality of products (or services, in some cases) may be linked to a contractor of the plurality of contractors. As shown, the virtual storefront system/repository 610 may be configured to receive one or more of lender criteria data, portal configuration data, contractor preferences data, virtual storefront templates data (e.g., specifications and/or inputs for configuring virtual storefront templates, the virtual storefront templates used to generate storefront UIs), experimentation parameters or variables, geospatial and weather data, property data, and market data, from the one or more databases 607. The contractor UI 620, storefront UI 625, and virtual storefront module 630 may be similar or substantially similar to the contractor UI 320, storefront UI 325, and virtual storefront module 330, respectively, previously described in relation to FIG. 3. It should be noted that the number of contractor and storefront UIs illustrated in FIG. 6 are not intended to be limiting, and more than one contractor UI and storefront UI may be utilized in other embodiments.

As seen, the virtual storefront module 630 may be in communication with or may comprise one or more engines (also referred to as modules), including, but not limited to, a storefront experimentation engine 601 (also referred to as an experiments or experimentation module, or an optimization/testing module), a billing engine 602, a customer qualification engine 603, a live support matching engine 604, and a contract and payment engine 608. In some cases, the system 600 may further comprise an optional product recommendation and quoting engine 606, which may or may not be a part of the virtual storefront module 630. In either case, the product recommendation and quoting engine 606 may be in communication with the virtual storefront module 630 over the network 640, for instance, via an API. Other engines or modules not illustrated in FIG. 6 are contemplated in different embodiments, for instance, any of the modules previously described in relation to FIG. 1. In some non-limiting examples, the virtual storefront module 630 may further comprise a product identifying module 114, a contractor preference identifying module 124, an accuracy level determination module 126, a survey generating module 132, etc. In some cases, the virtual storefront module 630 may be implemented on a server or computing platform (e.g., computing platform 102 in FIG. 1) and may be communicatively coupled to one or more databases 607. For instance, the virtual storefront module 630 may be communicatively coupled to a first database 607-a storing lender criteria information, a second database 607-b storing portal configuration information, a third database 607-c storing contractor preferences information, a fourth database 607-d storing information, such as configuration information, for one or more virtual storefront templates, a fifth database 607-e storing experimentation parameters or variables, a sixth database 607-f storing geospatial and/or weather related data, and a seventh database 607-g storing market related data. The number and type of databases is not intended to be limiting, and more or less than seven databases 607 may be utilized in other embodiments. Additionally or alternatively, additional databases storing any other relevant information may also be utilized, for instance, a database for storing contractor specific data (e.g., green energy score for a contractor, contractor reliability and/or ratings, online reviews, etc.) may be implemented in one non-limiting example.

In some embodiments, the databases 607 may store information received from a plurality of contractors (e.g., solar installation companies, lawncare companies, re-roofing companies, etc.), lenders (e.g., banks, solar panel loan companies, etc.), third party sources (e.g., for weather related data, satellite imagery, aerial photographs, market data collected from surveys, online forums, etc.). In some embodiments, the system 600 may receive portal configuration, lender criteria, and/or contractor preferences related information from one or more contractors, which may be used to setup the respective contractor UIs 620. In some embodiments, the lender criteria and/or contractor preferences may also be utilized by the customer qualification engine 603 for instance, to determine a qualification status for a customer, as described elsewhere and throughout this disclosure.

In some examples, a contractor or service provider wishing to deploy their business online may utilize the system 600 to generate at least one B2C storefront UI 625 that may be displayed to new or existing customers. In some cases, a contractor may utilize a storefront setup wizard, previously described in relation to FIG. 4, to configure at least one virtual storefront template. In some embodiments, the virtual storefront template comprises information pertaining to one or more of the theming/styling (i.e., a layout, look, feel, etc.) and/or type of data to be presented or accentuated for one or more virtual storefronts. In some cases, at least one virtual storefront (i.e., storefront UI 625) may be displayed to the user. As noted above, in some cases, the storefront UI may serve to replace at least a portion of an existing website or interface associated with the contractor. In some embodiments, the contractor may provide one or more of a lender criteria and contractor specific preferences via the contractor UI 620. These may be stored in, for instance, databases 607-a and 607-c, respectively, in electronic communication with the virtual storefront module 630. In some cases, the contractor UI 620 may also display one or more of: reporting and analytics data, billing and payments data, optimization/testing data (also referred to as experimentation data), and advertising data or campaigns specific to the contractor. In some cases, the storefront setup wizard (e.g., shown as storefront setup wizard 401 in FIG. 4) may allow a contractor (e.g., a solar panel installation company) to setup a virtual storefront template, where the virtual storefront template may be used to generate at least one virtual storefront (or storefront UI) for display to potential customers. In some cases, customers may access the virtual storefront UI (e.g., storefront UI 625) via a computing device (e.g., a user device associated with the customer). Some non-limiting examples of computing devices that be used to access the virtual storefront template include a smartphone, a laptop, a desktop, a Netbook, and/or a tablet. The computing device may or may not be capable of connecting to the internet. For instance, in one non-limiting example, the computing device may comprise a kiosk at a home improvement store, where the kiosk may or may not be connected to the internet. In some aspects, the storefront may serve as a gateway for the contractor's business since new customers may sign up for the contractor's services through the storefront UI 625.

In some cases, the storefront optimization/testing engine 601 (also referred to as experimentation engine 601) may be configured to receive one or more specifications and/or inputs regarding a new virtual storefront template from a contractor or system administrator. In some cases, the new virtual storefront template (also referred to as a "sister" or "challenger" virtual storefront template) may be generated by modifying an existing virtual storefront template, for instance, by applying the new template specifications and/or inputs to the existing virtual storefront template. In some embodiments, a new virtual storefront or storefront UI may be generated from the new virtual storefront template. In some examples, the existing virtual storefront template may have been previously created by the contractor, or alternatively, recommended by the system. In some cases, a contractor or service provider may utilize the experimentation engine 601 to optimize the theming and styling (i.e., look and feel) of their virtual storefront template, which may serve to enhance customer acquisition. In other cases, the experimentation engine 601 may enable the contractor to utilize different inputs (e.g., a price input for modeling prices, where the per unit product cost input may comprise a dollar/watt, a dollar/square foot, etc.) for assessing the performance of different virtual storefront templates. For instance, the experimentation engine 601 may allow a contractor to compare revenues generated by two different virtual storefront templates using different pricing models.

In some circumstances, a contractor may either lack the knowledge and/or skills to generate a virtual storefront template that is not only appealing (e.g., in aesthetics, provides a smooth user experience) to customers, but also easily accessible from different platforms (e.g., smartphones, laptops, different operating systems, such as Windows, Linux, Mac OS, etc.). Additionally, even if the contractor were competent in generating a storefront/website for their online business, it may not be readily apparent what is the most optimal format, presentation, type of information to present, etc., to enhance customer retention, new customer acquisition, leads generated, and/or revenue generated, to name a few non-limiting examples. According to aspects of this disclosure, the optimization engine 601 for virtual storefront templates may be configured to not only provide a platform for contractors to gauge the performance of their existing virtual storefront template versus a new virtual storefront template, but also provide virtual storefront template suggestions based on the performance results for virtual storefront templates associated with other contractors. In some instances, the system 600 may be configured to monitor the performance results for storefronts (e.g., generated from a plurality of different virtual storefront templates) across a plurality of contractors simultaneously, which may be stored in database 607-d. Further, the confluence of the data from each storefront may be used to optimize a first client or contractor's storefront when the data from the first client alone is insufficient, as an example. Thus, the ability to leverage the data of the group (e.g., all contractors in the solar panel installation business) may serve to enhance the customer acquisition process for one or more contractors using the system of the present Application.

Figure 7:
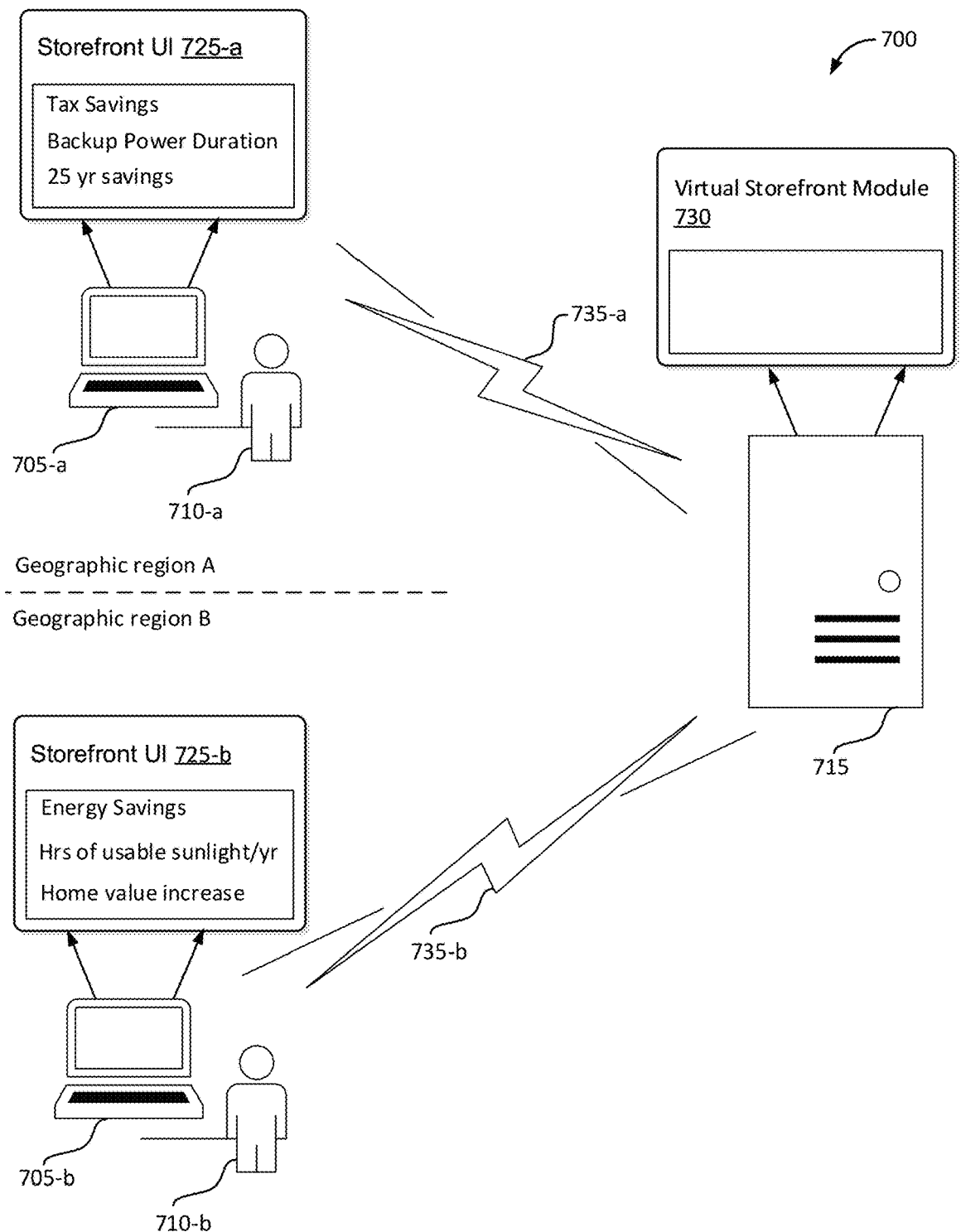
FIG. 7 illustrates an example of a system for generating and optimizing virtual storefront templates, according to an embodiment of the disclosure.

Turning now to FIG. 7, which illustrates an example of different virtual storefronts (i.e., storefront UIs) generated by the storefront experimentation engine 601 of FIG. 6, according to an embodiment of the disclosure. FIG. 7 illustrates a system 700 comprising a server 715, a virtual storefront module 730 implemented or hosted on the server 715, a user device 705-a associated with a first user 710-a, a second user device 705-b associated with a second user 710-b, and two storefront UIs 725-a and 725-b which may or may not be associated with the same contractor. In some cases, the storefront UIs 725 generated for display by the virtual storefront module 730 may be based in part on virtual storefront templates information received from the contractor(s) and stored in database 607-d, for instance. In some cases, the user devices 705-a and/or 705-b may be in communication over communication links 735-a and 735-b, respectively, with the server 715 hosting the virtual storefront module 730. In some cases, the communication may comprise one or more API calls and responses to API calls. Alternatively, the communication may comprise relaying HTML or CSS data for furnishing/generating a virtual storefront template. As noted above, the virtual storefront template may be implemented as an embeddable app (e.g., an app, such as a mobile or web app, embedded within an existing website for the contractor, may use Iframe HTML or any other techniques known in the art), or a microsite, although other implementation techniques are contemplated in different embodiments. For instance, other delivery methods (e.g., text or SMS; voice via a home assistant device, such as AMAZON ALEXA or GOOGLE HOME; email, etc.) in lieu of or in addition to the virtual storefront template are contemplated in other embodiments.

In some cases, storefront experimentation and optimization may involve testing multiple virtual storefront templates to converge on an optimal solution for a particular localized market. As an example, the motivation to install solar panels may vary between different geographic regions (e.g., Geographic region A—Michigan vs Geographic region B—California) or even different jurisdictions within a state (e.g., San Francisco vs Los Angeles). For instance, the sunny weather in Geographic region B (e.g., California) may impart significantly higher savings than in Geographic region A (e.g., Michigan), which is known for its overcast skies, especially in winter. In such cases, for potential customers (e.g., user 710-*a*) residing in Geographic region A, the virtual storefront module 730 may not emphasize the savings or financial benefit (i.e., presented using the storefront UI 725-*a*) to the same degree as for potential customers (e.g., user 710-*b*) in Geographic region B, who are displayed the storefront UI 725-*b*. However, in Geographic region A, the user 710-*a* may opt to go solar because of frequent power outages, for instance. In this case, the virtual storefront module 730 may emphasize on the duration for which backup power (e.g., from a lithium ion backup battery) is available when paired with solar panels (e.g., <1 hour vs 10 hrs. per month) in the storefront UI 725-*a* displayed on the user device 705-*a*. Additionally, the virtual storefront module 730 may also target the user 710-*a* for one or more relevant cross-sell or up-sell options (e.g., battery pack for storing energy), for instance, based on their psychographic and/or behavioral traits (e.g., distrust of utility companies, frustration with power outages). On the other hand, the user 710-*b* being displayed storefront UI 725-*b* may be targeted with a different set of cross-sell or up-sell options (e.g., an ornamental piece or design installed around the solar panels to improve their aesthetics). It should be noted that the storefront UIs 725-*a* and 725-*b* may be generated from the same or a different virtual storefront template.

In another example, the storefront UI 725-*a* may emphasize on the property tax savings over the energy savings, the latter of which may be a prominent factor in storefront UI 725-*b*. In some examples, it may not be apparent as to what factors should hold greater prominence in a particular geographic region. In such cases, experiments may be run using one or more experimentation parameters or variables (e.g., stored in database 607-*e* in FIG. 6), geospatial and weather data (e.g., stored in database 607-*f*), and/or market data (e.g., stored in database 607-*g* in FIG. 6) to pinpoint on the factors that potential customers are likely to focus on.

In some cases, optimization may also be utilized to personalize the shopping experience, for instance, based on whether someone is a first-time shopper, whether they have been "in-market" for a long-time, based on how they arrived at the storefront 725 (e.g., Web search, an advertisement, a QR code, etc.), to name a few non-limiting examples. In such cases, the system may test and experiment by showing different customers different versions of the storefront based on whether they are a first-time shopper, how they arrived at the storefront, etc., further described in relation to FIGS. 8 and 9. Additionally or alternatively, predictive models (e.g., using machine learning), logic based models, or any other applicable models may be used to determine an optimal storefront to display to users. Some non-limiting examples of input data used in these predictive models may include geographic information (i.e., locational data for the user), the source of origination (i.e., how they arrived at the storefront), and/or second or third party data (e.g., demographics, psychographics, click stream, etc.) about the user.

Figure 8:
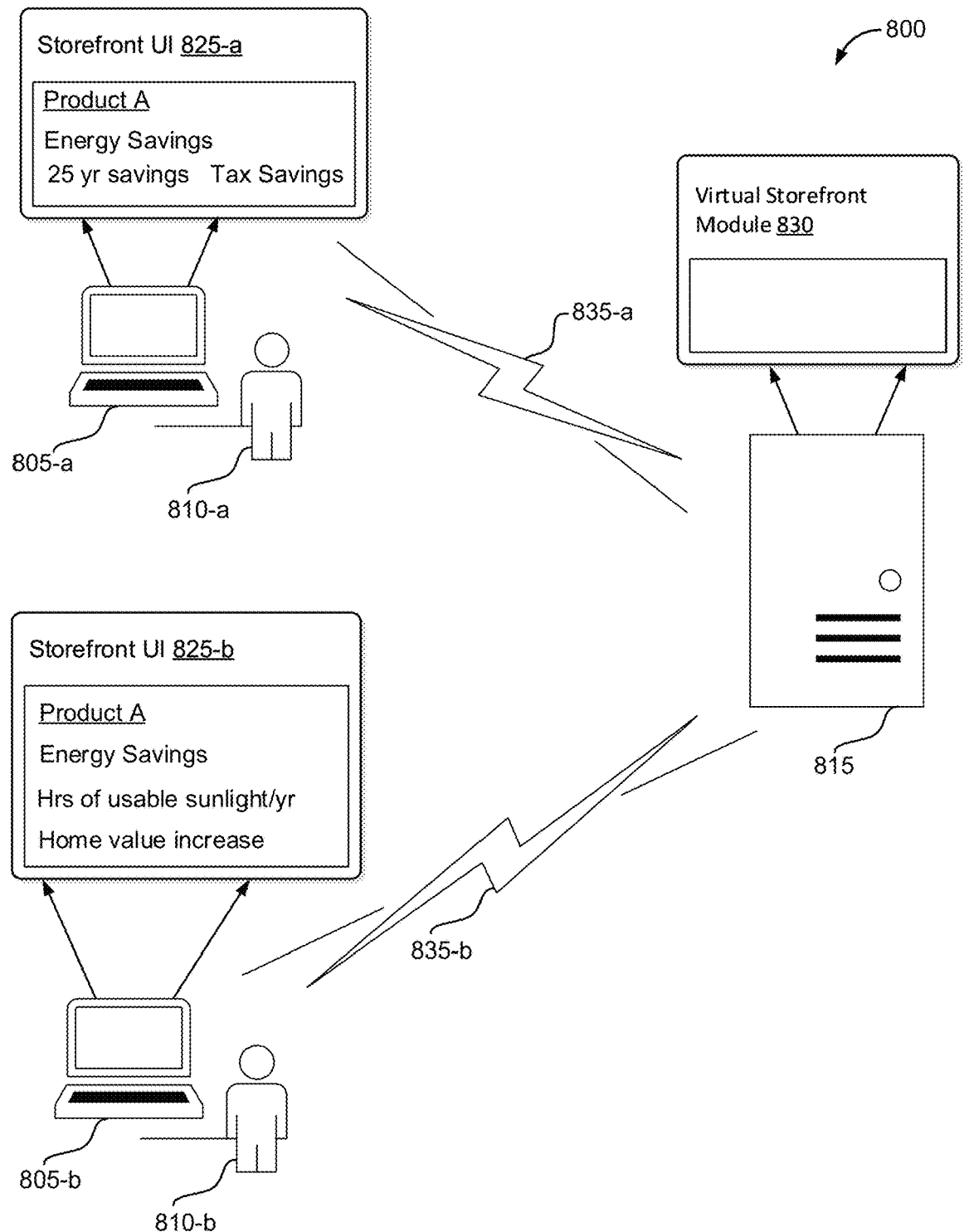
FIG. 8 illustrates an example of a system for generating and optimizing virtual storefront templates, according to an alternate embodiment of the disclosure.

Turning now to FIG. 8, which illustrates a system 800 comprising a virtual storefront module 830, a server 815 hosting or implementing the virtual storefront, a first user device 805-*a* associated with a first user 810-*a*, and a second user device 805-*b* associated with a second user 810-*b*, a storefront UI 825-*a* displayed on the first user device 805-*a*, and a storefront UI 825-*b* displayed on the second user device 805-*b*. In some cases, the user devices 805 may be in communication (e.g., over communication links 835-*a* and 835-*b*) with the server 815. The virtual storefront module 830 may implement one or more aspects of the virtual storefront template generating module 144 and/or virtual storefront module 160 previously described in relation to FIG. 1. Further, the virtual storefront module 830 may be similar or substantially similar to the virtual storefront modules described herein, including at least virtual storefront module 630, and may be associated with one or more of the storefront UIs 825-*a* and 825-*b*. In some embodiments, the virtual storefront module 830 may be electronically and communicatively coupled to one or more databases (e.g., shown as databases 607 in FIG. 6) and may comprise one or more engines, including at least an experimentation engine (e.g., shown as storefront experimentation engine 601 in FIG. 6). In this example, the users 810 may reside in the same geographic region and the storefront UIs 825 may be associated with the same contractor. While storefront UIs 825 indicate that the information being displayed to the users pertain to the same product (e.g., product A), in some cases, the information may pertain to different products (e.g., product A for user 810-*a*, product B for user 810-*b*). In some cases, the virtual storefront module 830 may utilize different virtual storefront templates for generating the storefront UIs 825-*a* and 825-*b*. In some examples, comparisons of virtual storefront templates may be made through the performance results of two or more virtual storefronts (e.g., storefronts 825-*a* and 825-*b*), further described in relation to FIG. 9.

In this example, the experimentation engine 601 (or the virtual storefront module 830) may display different information via the storefront UIs 825-*a* and 825-*b*. For instance, the experimentation engine 601 may determine based on demographic, psychographic, and/or behavioral data for the user 810-*a* that along with energy savings, emphasis on tax savings and/or 25 year savings may enhance the likelihood of the user 810-*a* purchasing the product A. Similarly, the experimentation engine 601 may determine that user 810-*b* has an enhanced likelihood of purchasing the product (e.g., product A, or another product) by emphasizing on energy savings (similar to storefront UI 825-*a*), but also hours of usable sunlight/year and/or home value increase. Besides the demographic and behavioral data, the experimentation engine 601 may also be configured to utilize one or more of product preferences information and situational specs (e.g., utility bill, location, etc.) for providing a product recommendation and/or quote. In some cases, this additional information may be determined after receiving a product recommendation request and/or a quote request from the user. Additionally or alternatively, this additional information may be determined based on analyzing one or more site images (e.g., satellite or aerial images, user uploaded images), LIDAR data, and/or additional information about the customer's property determined from analyzing roof or property measurements, pitch of sun, orientation of property (e.g., east facing, west facing, etc.).

Figure 9:
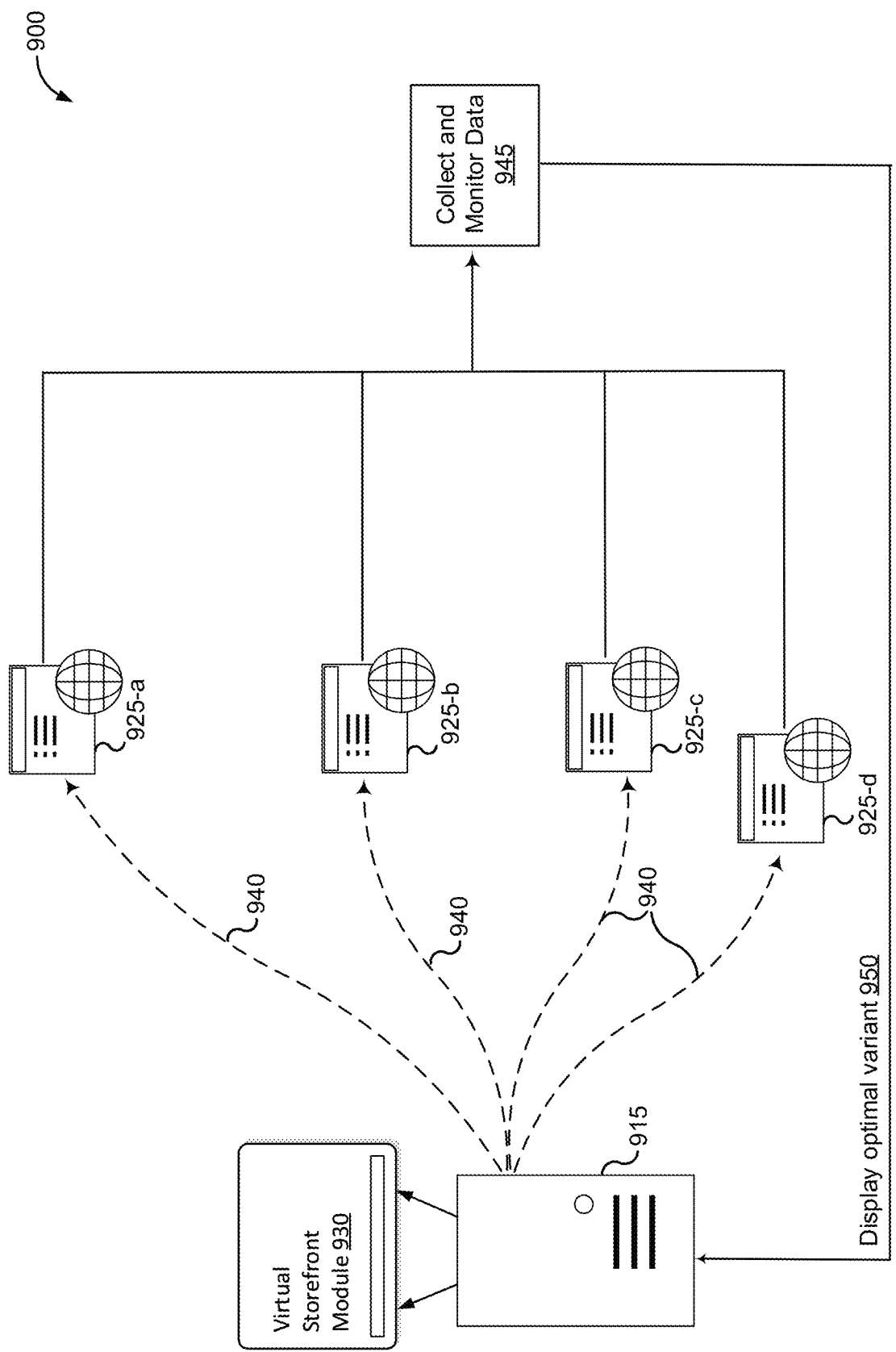
FIG. 9 illustrates an example of a system for optimization and testing of virtual storefront templates, according to an alternate embodiment of the disclosure.

FIG. 9 illustrates an example of a system 900 configured for storefront optimization and testing, according to an embodiment of the disclosure. System 900 may be similar or substantially similar to any of the systems described herein, including at least systems 300, 600, 700, and/or 800 described in relation to FIGS. 3, 6, 7, and/or 8, respectively.

In some embodiments, the system 900 utilizes a model (e.g., a predictive model, a machine learning model, etc.) for determining an optimal virtual storefront template, where the virtual storefront template may be used to generate virtual storefront(s) displayed to users. The machine learning model may be one of a supervised or unsupervised machine learning model. As shown, the system 900 comprises a server 915 hosting or implementing a virtual storefront module 930, which may be similar or substantially similar to virtual storefront module 630 previously described in relation to FIG. 6. The virtual storefront module 930 comprises one or more engines (not shown for sake of brevity), including, but not limited to, the storefront experimentation engine 601, the billing engine 602, the customer qualification engine 603, the live support matching engine 604, and the contract and payment engine 608. In some cases, the system 900 may further comprise an optional product recommendation and quoting engine 606, which may or may not be a part of the virtual storefront module 930. In either case, the product recommendation and quoting engine 606 may be in communication (e.g., via an API) with the virtual storefront module 930 over a wireless network (e.g., 3G, 4G, 5G, Wi-Fi), or alternatively, over a wired network (e.g., ethernet). Other engines or modules not listed above are contemplated in different embodiments, for instance, any of the modules previously described in relation to FIG. 1.

As noted above, the experimentation or optimization engine for virtual storefront templates may be configured to not only enable contractors to gauge the performance of an existing virtual storefront template versus a new virtual storefront template, but also provide virtual storefront template suggestions based on monitoring virtual storefront templates utilized by other contractors. In some embodiments, the performance related information (e.g., graphs comparing performance for different storefront UIs generated from different virtual storefront templates, quantitative data, etc.) may be displayed in one or more of the reporting and analytics tab 402, optimization tab 404, and testing tab 405, previously discussed in relation to FIG. 4. In some instances, the system 900 may be configured to monitor the performance results for virtual storefronts (or storefront UIs) across a plurality of contractors simultaneously.

In some cases, each storefront UI 925 may be generated from a different virtual storefront template. Further, comparisons of virtual storefront templates can be made by analyzing the performance results of different virtual storefronts (or storefront UIs) generated from the different virtual storefront templates. In the example shown, the system 900 is testing multiple storefront UIs 925 (e.g., storefront UIs 925-*a-d*) on one or more user devices (not shown) by dynamically modifying the output from the virtual storefront module 930. For instance, storefront UIs 925 may be associated with the same contractor but may be used to display different information (i.e., as previously discussed in relation to FIGS. 7 and/or 8), have a different format or layout (e.g., since they are generated using different virtual storefront templates), and/or provide a different user experience (UX). In one example, the experimentation engine may display storefront UI 925-*a* to potential customers that came to the storefront using web search, storefront UI 925-*b* to potential customers that came to the storefront using a display ad, storefront UI 925-*c* to customers that came to the storefront using a QR code, and storefront UI 925-*d* to customers that came to the storefront through word of mouth (e.g., recommendation from an existing customer). In this way, the experimentation engine may enable contractors to provide a personalized shopping experience.

In some embodiments, the different storefront UIs 925 may be tested/experimented to determine an optimal virtual storefront template (e.g., virtual storefront template used to generate storefront UI 925-*d*), where the optimal virtual storefront template may be used to generate virtual storefronts (or storefront UIs) for display to all future customers of a first contractor. For instance, the storefront UI 925-*a* may be generated from an initial virtual storefront template configured by the first contractor using the storefront setup wizard (e.g., storefront setup wizard 401 in FIG. 4) and the storefront UI 925-*b* may be generated based on one or more specifications and/or inputs received from the first contractor (or a system administrator) regarding a new virtual storefront template. In one non-limiting example, the storefront UI 925-*b* may be generated by applying the new template specifications and/or inputs to the initial storefront template. In other words, the system 900 may modify at least a portion of the first virtual storefront template to generate the second virtual storefront template. Further, the storefront UI 925-*b* may be generated from the second virtual storefront template. In some other cases, the experimentation engine may be configured to modify at least a portion of the first virtual storefront template based on obtaining one or more first performance results (e.g., for storefront UI 925-*a*), where the one or more first performance results are specific to the first virtual storefront template. Furthermore, the storefront UIs 925-*c* and 925-*d* may be generated based on analyzing and monitoring performance results for other storefront UIs associated with one or more other contractors. In some cases, the storefront UIs associated with the first contractor may be subject to one or more constraints, where the constraints may be specified, for instance, via the storefront setup wizard. In such cases, the virtual storefront module 930 (or experimentation engine) may generate the storefront UIs 925-*c* and/or 925-*d* based on the storefront UIs associated with the one or more other contractors, but subject to the specified constraints.

As shown, the experimentation engine may utilize one or more experimentation parameters or variables retrieved from a database, such as database 607-*e* in FIG. 6, to create an optimization experiment using the initial storefront UI 925-*a* and the candidate storefront UIs (i.e., storefront UIs 925-*b-d*). Some non-limiting examples of experimentation parameters or variables may include traffic split ratio, test duration, success criteria, and/or termination conditions. In some cases, the success criteria may comprise one or more of leads generated per storefront, Return on Ad Spend (ROAS) per storefront, and revenue per storefront. Further, termination conditions may be used to specify when the optimization experiment should terminate, for instance, after a degree of statistical certainty has been established, after a pre-defined number of users (e.g., 50, 100, 1000, etc.) have accessed each storefront UI 925 or alternatively, cumulatively accessed the different storefront UIs 925, and/or after the optimization experiment has been run for a pre-defined duration of time (e.g., 1 week, 10 days, 30 days, 3 months, etc.). In some embodiments, the experimentation parameters or variables may be fixed, or may dynamically change based on use case, contractor specified preferences, etc.

In some cases, a multi-arm bandit test (e.g., shown by one or more arms 940) may be utilized to dynamically allocate traffic to the different storefronts 925 based on the success of each arm 940 of the test. As used herein, the multi-armed bandit (MAB) test refers to a type of A/B testing (e.g., a type of experiment where random users are shown a different version than the original or control version to determine an optimal version that maximizes a certain metric, such as conversion) that utilizes machine learning to learn from data (e.g., shown as collect and monitor data 945 in FIG. 9) gathered during the storefront optimization test to dynamically increase the traffic allocation to one or more storefront UIs 925 that are showing enhanced performance (e.g., a higher number of leads generated, higher revenue, higher conversion rate, higher lead to sale conversion rate, etc.). Said another way, one or more storefront UIs 925 (e.g., storefront UI 925-*b*) that are less favorable or optimal may receive less and less network traffic over time in favor of other storefront UIs 925 (e.g., storefront UI 925-*d*). In some cases, the MAB test illustrated in FIG. 9 may be implemented using dynamic traffic allocation techniques which may enable the experimentation engine to continuously identify the degree with which one storefront UI is outperforming others, for instance, based on analyzing the collected and monitored data. In some cases, the virtual storefront module 930 may be configured to collect and monitor data 945 and route a substantial portion of the network traffic dynamically and in real-time to the optimal storefront UI (i.e., shown as display optimal variant 950).

Figure 10:
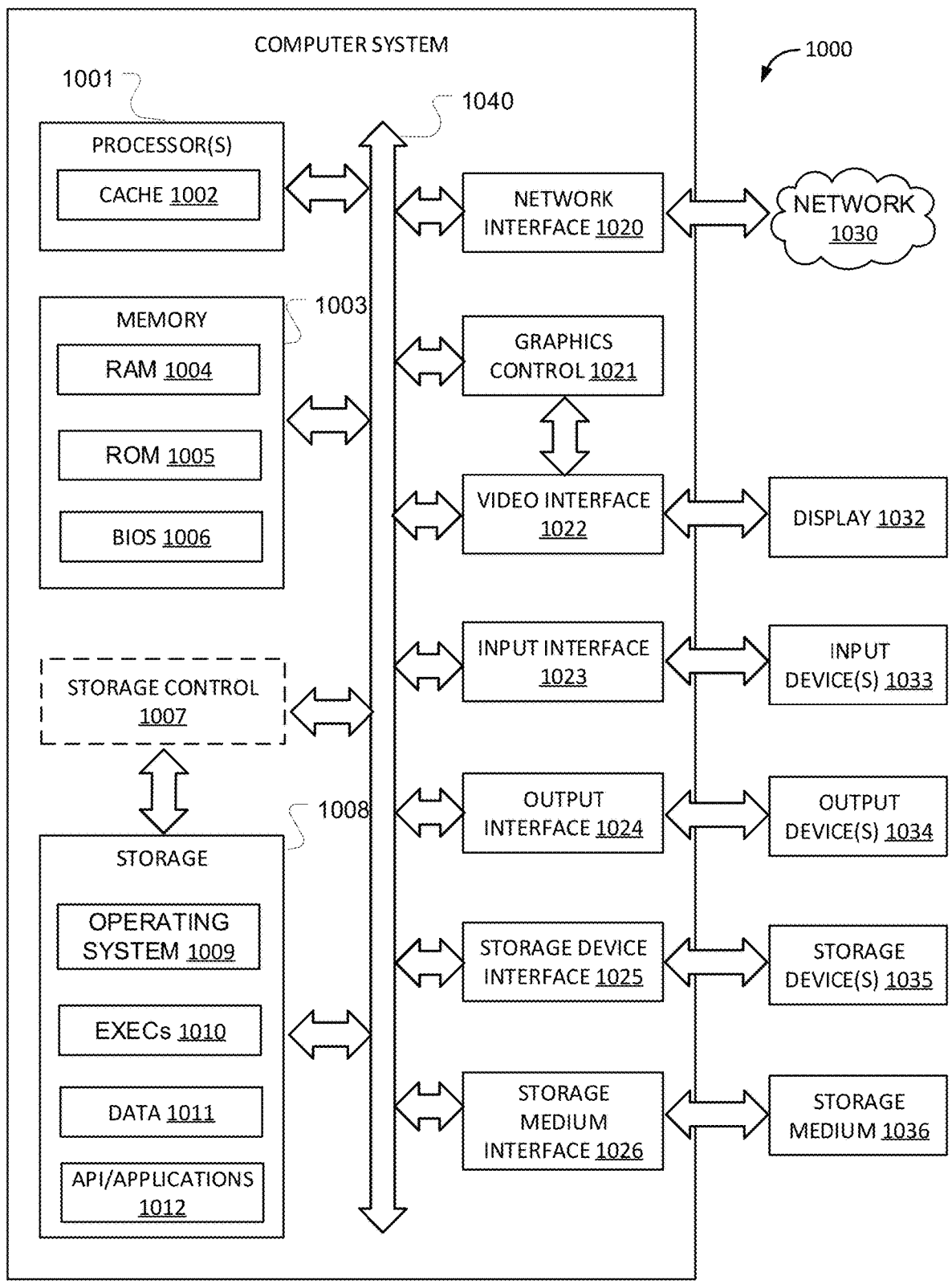
FIG. 10 illustrates a block diagram of a computer system configured for optimizing customer acquisition according to an embodiment of the disclosure.

FIG. 10 illustrates a diagrammatic representation of one embodiment of a computer system 1000, within which a set of instructions can execute for causing a device to perform or execute any one or more of the aspects and/or methodologies of the present disclosure. The components in FIG. 10 are examples only and do not limit the scope of use or functionality of any hardware, software, firmware, embedded logic component, or a combination of two or more such components implementing particular embodiments of this disclosure. Some or all of the illustrated components can be part of the computer system 1000. For instance, the computer system 1000 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 1000 includes at least a processor 1001 such as a central processing unit (CPU) or a graphics processing unit (GPU) to name two non-limiting examples. Any of the subsystems described throughout this disclosure could embody the processor 1001. The computer system 1000 may also comprise a memory 1003 and a storage 1008, both communicating with each other, and with other components, via a bus 1040. The bus 1040 may also link a display 1032, one or more input devices 1033 (which may, for example, include a keypad, a keyboard, a mouse, a stylus, etc.), one or more output devices 1034, one or more storage devices 1035, and various non-transitory, tangible computer-readable storage media 1036 with each other and/or with one or more of the processor 1001, the memory 1003, and the storage 1008. All of these elements may interface directly or via one or more interfaces or adaptors to the bus 1040. For instance, the various non-transitory, tangible computer-readable storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1002 for temporary local storage of instructions, data, or computer addresses. Processor(s) 1001 are configured to assist in execution of computer-readable instructions stored on at least one non-transitory, tangible computer-readable storage medium. Computer system 1000 may provide functionality as a result of the processor(s) 1001 executing software embodied in one or more non-transitory, tangible computer-readable storage media, such as memory 1003, storage 1008, storage devices 1035, and/or storage medium 1036 (e.g., read only memory (ROM)). Memory 1003 may read the software from one or more other non-transitory, tangible computer-readable storage media (such as mass storage device(s) 1035, 1036) or from one or more other sources through a suitable interface, such as network interface 1020. Any of the subsystems herein disclosed could include a network interface such as the network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software. In some embodiments, an FPGA can store instructions for carrying out functionality as described in this disclosure. In other embodiments, firmware includes instructions for carrying out functionality as described in this disclosure.

The memory 1003 may include various components (e.g., non-transitory, tangible computer-readable storage media) including, but not limited to, a random-access memory component (e.g., RAM 1004) (e.g., a static RAM "SRAM", a dynamic RAM "DRAM, etc.), a read-only component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable non-transitory, tangible computer-readable storage media. In some instances, ROM 1005 and RAM 1004 include non-transitory, tangible computer-readable storage media for carrying out a method. In one example, a basic input/output system 1006 (BIOS), including basic routines that help to transfer information between elements within computer system 1000, such as during start-up, may be stored in the memory 1003.

Fixed storage 1008 is connected bi-directionally to processor(s) 1001, optionally through storage control unit 1007. Fixed storage 1008 provides additional data storage capacity and may also include any suitable non-transitory, tangible computer-readable media described herein. Storage 1008 may be used to store operating system 1009, EXECs 1010 (executables), data 1011, API applications 1012 (application programs), and the like. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, such as mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, a check or receipt printer, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1000 shown in FIG. 10 such as, but not limited to, the network 1030, processor 1001, memory, 1003, etc., may comprise a cloud computing system. In one such system, front-end systems such as input devices 1033 may provide information to back-end platforms such as servers (e.g. computer systems 1000) and storage (e.g., memory 1003). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Alternate Embodiments

One aspect of the present disclosure relates to a system configured for optimizing customer acquisition. The system may include one or more hardware processors configured by machine-readable instructions. The processor(s) may be configured to receive, from a user device, a product recommendation request. The product recommendation request may include one or more of product preferences and a location. The product preferences may include savings or pricing information. The processor(s) may be configured to upload one or more site images for the location. The one or more site images may include at least one of aerial images and satellite images. The processor(s) may be configured to determine site specific information based on the one or more site images and the location. The site specific information may include one or more of geospatial data, property data, weather data, solar irradiance data, and information pertaining to nearby or adjacent structures. The processor(s) may be configured to identify one or more products for recommendation based on the site specific information, the product recommendation request, or a combination thereof. The one or more products may be associated with a virtual storefront template, also referred to as a storefront user interface (UI). The processor(s) may be configured to generate a quote for at least one product of the one or more products. The processor(s) may be configured to display, on the user device, the quote for the at least one product. The processor(s) may be configured to access, from the user device, a first virtual storefront template associated with a first product of the at least one product. The processor(s) may be configured to determine, for a user associated with the user device, a qualification status for the first product.

Another aspect of the present disclosure relates to a method for optimizing customer acquisition. The method may include receiving, from a user device, a product recommendation request. The product recommendation request may include one or more of product preferences and a location. The product preferences may include one or more of a product type, budget, payment method (e.g., in cash or in full, credit card, loan, etc.), target savings/return on investment (ROI), orientation or location on the roof (if applicable, for instance, for solar panel installation), to name a few non-limiting examples. In some cases, the computing platform or the system may be configured to return pricing information (e.g., via the quote). The method may include uploading one or more site images for the location. The one or more site images may include at least one of aerial images and satellite images. The method may include determining site specific information based on the one or more site images and the location. The site specific information may include one or more of geospatial data, weather data, solar irradiance data, and information pertaining to nearby or adjacent structures. The method may include identifying one or more products for recommendation based on the site specific information, the product recommendation request, or a combination thereof. The one or more products may be associated with a virtual storefront template. The method may include generating a quote for at least one product of the one or more products. The method may include displaying, on the user device, the quote for the at least one product. The method may include accessing, from the user device, a first virtual storefront template associated with a first product of the at least one product. The method may include determining, for a user associated with the user device, a qualification status for the first product.

Yet another aspect of the present disclosure relates to a computing platform configured for optimizing customer acquisition. The computing platform may include a non-transient computer-readable storage medium having executable instructions embodied thereon. The computing platform may include one or more hardware processors configured to execute the instructions. The processor(s) may execute the instructions to receive, from a user device, a product recommendation request. The product recommendation request may include one or more of product preferences and a location. The product preferences may include one or more of a product type, budget, payment method (e.g., in cash or in full, credit card, loan, etc.), target savings/return on investment (ROI), orientation or location on the roof (if applicable, for instance, for solar panel installation), to name a few non-limiting examples. In some cases, the computing platform or the system may be configured to return pricing information (e.g., via the quote). The processor(s) may execute the instructions to upload one or more site images for the location. The one or more site images may include at least one of aerial images and satellite images. The processor(s) may execute the instructions to determine site specific information based on the one or more site images and the location. The site specific information may include one or more of geospatial data, weather data, solar irradiance data, and information pertaining to nearby or adjacent structures. The processor(s) may execute the instructions to identify one or more products for recommendation based on the site specific information, contractor preferences, the product recommendation request, or a combination thereof. The one or more products may be associated with a virtual storefront template. The processor(s) may execute the instructions to generate a quote for at least one product of the one or more products. The processor(s) may execute the instructions to display, on the user device, the quote for the at least one product. The processor(s) may execute the instructions to access, from the user device, a first virtual storefront template associated with a first product of the at least one product. The processor(s) may execute the instructions to determine, for a user associated with the user device, a qualification status for the first product.

Still another aspect of the present disclosure relates to a system configured for optimizing customer acquisition. The system may include means for receiving, from a user device, a product recommendation request. The product recommendation request may include one or more of product preferences and a location. The product preferences may include a one or more of a product type, budget, payment method (e.g., in cash or in full, credit card, loan, etc.), target savings/return on investment (ROI), orientation or location on the roof (if applicable, for instance, for solar panel installation), to name a few non-limiting examples. In some cases, the computing platform or the system may be configured to return pricing information (e.g., via the quote). The system may include means for uploading one or more site images for the location. The one or more site images may include at least one of aerial images and satellite images. The system may include means for determining site specific information based on the one or more site images and the location. The site specific information may include one or more of geospatial data, weather data, solar irradiance data, and information pertaining to nearby or adjacent structures. The system may include means for identifying one or more products for recommendation based on the site specific information, the product recommendation request, contractor preferences or a combination thereof. The one or more products may be associated with a virtual storefront template. The system may include means for generating a quote for at least one product of the one or more products. The system may include means for displaying, on the user device, the quote for the at least one product. The system may include means for accessing, from the user device, a first virtual storefront template associated with a first product of the at least one product. The system may include means for determining, for a user associated with the user device, a qualification status for the first product.

Even another aspect of the present disclosure relates to a non-transient computer-readable storage medium having instructions embodied thereon, the instructions being executable by one or more processors to perform a method for optimizing customer acquisition. The method may include receiving, from a user device, a product recommendation request. The product recommendation request may include one or more of product preferences and a location. The product preferences may include one or more of a product type, budget, payment method (e.g., in cash or in full, credit card, loan, etc.), target savings/return on investment (ROI), orientation or location on the roof (if applicable, for instance, for solar panel installation), to name a few non-limiting examples. In some cases, the method may include returning pricing information (e.g., via the quote). The method may include uploading one or more site images for the location. The one or more site images may include at least one of aerial images and satellite images. The method may include determining site specific information based on the one or more site images and the location. The site specific information may include one or more of geospatial data, weather data, solar irradiance data, and information pertaining to nearby or adjacent structures. The method may include identifying one or more products for recommendation based on the site specific information, the product recommendation request, or a combination thereof. The one or more products may be associated with a virtual storefront template. The method may include generating a quote for at least one product of the one or more products. The method may include displaying, on the user device, the quote for the at least one product. The method may include accessing, from the user device, a first virtual storefront template associated with a first product of the at least one product. The method may include determining, for a user associated with the user device, a qualification status for the first product.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating and optimizing virtual storefront templates, the system comprising:
   one or more hardware processors configured by machine-readable instructions to:
   receive, using an interface provided on an administrator device, a first set of inputs, wherein the administrator device is associated with a contractor and accesses a virtual store front module hosted on a virtual storefront server using one or more integrated application programming interfaces (API) configured to make calls to the virtual storefront module;
   generate a first virtual storefront template based at least in part on the first set of inputs;
   access, from a user device via a user template accessing module, a first virtual storefront user interface (UI) generated from the first virtual storefront template, the first virtual storefront UI generated by populating one or more fields of the virtual storefront template in response to one or more calls by the one or more API to the virtual storefront server, wherein the first virtual storefront UI is capable of being accessed to obtain product recommendations, quotes, sales proposals or a combination thereof;
   receive, from the user device, a request, wherein the request comprises a location and one or more product preferences, and wherein at least one of the one or more product preferences comprises a project budget or a cost offset;
   determine site specific information via a site information determination module based at least in part on the request, the site specific information comprising one or more of geospatial data, weather data, site measurement data, and solar irradiance data;

identify through a product identifying module one or more products for recommendation based on the site specific information;

display at least one of a product recommendation, a quote, and a sales proposal for at least one product of the one or more products via the first virtual storefront UI accessed from the user device;

obtain one or more first performance results, the one or more first performance results specific to the first virtual storefront template;

generate the at least one of the product recommendation, the quote, and the sales proposal for the at least one product based at least in part on identifying the one or more products, and wherein identifying the one or more products is based at least in part on identifying one or more preferences specified by the contractor, product options, pricing data for the product options, information pertaining to one or more projects at or near the location, demographic data for the user, and behavioral data for the user;

apply at least one of a machine learning model or a logic based model to determine an accuracy level for the one or more products for recommendation based on one or more of input data quality, wherein the input data quality is based in part on one or more of the site specific information, the contractor specified preferences, and the information pertaining to the one or more projects at or near the location; and wherein generating and displaying the quote for the at least one product is based on a respective accuracy level for the at least one product exceeding a threshold accuracy level for the product recommendation.

2. The system of claim 1, wherein the one or more hardware processors are further configured by machine-readable instructions to:

upload one or more site images for the location, wherein the one or more site images comprise one or more of aerial images, satellite images, and images received from a user, the user associated with the user device; and wherein identifying the one or more products for recommendation is further based on analyzing the one or more uploaded site images.

3. The system of claim 1, wherein the one or more hardware processors are further configured by machine-readable instructions to:

apply at least one of a machine learning model or a logic based model to determine one or more additional products for cross-sell or up-sell to the user based at least in part on the demographic data, behavioral data, information pertaining to the location, or a combination;

generate at least one of a second product recommendation and a second quote for at least one of the one or more additional products; and display the at least one of the second product recommendation and the second quote via the first virtual storefront UI accessed from the user device.

4. The system of claim 1, wherein the one or more hardware processors are further configured by machine-readable instructions to:

receive, from the administrator device, one or more questions and a respective answer for at least one of the one or more questions;

generate a qualification survey based on the one or more questions and respective answers;

receive, via the user device, one or more of a pre-qualification request and financing options for the at least one product of the one or more products; and determine, for a user associated with the user device, one or more of a qualification status and the financing options for the at least one product.

5. The system of claim 4, wherein determining the qualification status comprises:

initiating one or more of the qualification survey and a credit check;

receiving, via the user device, one or more responses for the qualification survey;

determining a qualification score based at least in part on comparing a credit score associated with the credit check to a threshold credit score, the one or more responses for the screening survey with the one or more questions and respective answers, or a combination thereof, and wherein the qualification score is specific to the user and the at least one product; and wherein the one or more hardware processors are further configured by machine-readable instructions to display an approved qualification status based on the qualification score being at or above a threshold; or wherein the one or more hardware processors are further configured by machine-readable instructions to display one of a disqualified status or an indeterminable qualification status based on the qualification score being below the threshold.

6. The system of claim 5, wherein the one or more hardware processors are further configured by machine-readable instructions to:

display, on the user device, a prompt requesting the user to upload one or more supporting documents for determining a final qualification status based on the displayed indeterminable qualification status;

receive, via the user device, at least one supporting document of the one or more supporting documents;

analyze data from the at least one supporting document, wherein the analyzing comprises one or more of parsing textual information, optical character recognition, and image recognition; and wherein determining the final qualification status comprises one of updating the indeterminable qualification status to the approved qualification status or the disqualified status based at least in part on the analyzing the data from the at least one supporting document.

7. The system of claim 1, wherein generating the first virtual storefront template is based at least in part on demographic data for the user, behavioral data for the user, information pertaining to the location, one or more contractor inputs received from the contractor via the administrator device, one or more other virtual storefront templates generated for one or more other contractors, or a combination thereof.

8. The system of claim 7, wherein the one or more hardware processors are further configured by machine-readable instructions to:

receive, from the administrator device, a second set of inputs;

generate a second virtual storefront template based at least in part on the second set of inputs;

obtain one or more second performance results specific to the second virtual storefront template; and compare the one or more second performance results to the one or more first performance results to determine an optimal virtual storefront template between the first and the second virtual storefront templates for one or more input factors, the one or more input factors including at least the location.

9. The system of claim 8, wherein generating the second virtual storefront template comprises modifying at least a portion of the first virtual storefront template by applying the second set of inputs to the first virtual storefront template, and wherein modifying the at least the portion of the first virtual storefront template comprises at least one of: displaying different data, utilizing different inputs to model prices, and utilizing a different format for presenting data, and wherein the second virtual storefront template is used to generate a second virtual storefront UI.

10. The system of claim 8, wherein prior to comparing the one or more first and second performance results,
the one or more hardware processors are further configured by machine-readable instructions to:
receive, via the administrator device, one or more experimentation variables for an optimization experiment, the optimization experiment used to compare the first and second virtual storefront templates, and wherein the one or more experimentation variables comprise one or more of a traffic split ratio, a test duration, a success criteria, and termination conditions; and
execute the optimization experiment based on the one or more experimentation variables.

11. The system of claim 10, wherein the first virtual storefront template is used to display a first set of data in a first format, and wherein the second virtual storefront template is used to display one of the first set of data or a second set of data in a second format, the first format different from the second format and the first set of data different from the second set of data.

12. The system of claim 11, wherein the first set of data comprises a first price and the second set of data comprises a second price, and wherein the one or more first and second performance results comprise one or more of a revenue per virtual storefront template, leads per virtual storefront template, click-through-rate per virtual storefront template, a conversion rate per virtual storefront template, and a return on advertising spend (ROAS) per virtual storefront template.

13. The system of claim 1, wherein the one or more hardware processors are further configured by machine-readable instructions to:
generate a virtual storefront repository associated with a plurality of contractors and a plurality of products, including at least the contractor and the one or more products, and wherein each product of the plurality of products is linked to a contractor of the plurality of contractors, and wherein generating the virtual storefront is based at least in part on one or more of lender criteria data, portal configuration data, contractor preferences data, virtual storefront templates data, theming and styling related data, experimentation variables data, geospatial data, weather data, and market data.

14. The system of claim 1, wherein the one or more hardware processors are further configured by machine-readable instructions to:
receive a sales support request via the first virtual storefront template accessed from the user device;
generate an identifier for the sales support request; and
communicate with the user associated with the user device, wherein the communicating is based at least in part on a round-robin, first available, or weighted selection method, and wherein the communicating comprises utilizing the identifier in one or more of a live chat, an internet voice call, a screen sharing session, and an artificial intelligence or natural language processing based communication.

15. A method for generating and optimizing virtual storefront templates, the method comprising:
receiving, using an interface provided on an administrator device, a first set of inputs, wherein the administrator device is associated with a contractor and accessing a virtual store front module hosted on a virtual storefront server using one or more integrated application programming interfaces (API) configured to make calls to the virtual storefront module;
generating a first virtual storefront template based at least in part on the first set of inputs;
accessing, from a user device, a first virtual storefront user interface (UI) generated from the first virtual storefront template, the first virtual storefront UI generated by populating one or more fields of the virtual storefront template in response to one or more calls by the one or more API to the virtual storefront server, wherein the first virtual storefront UI is capable of being accessed to obtain product recommendations, quotes, sales proposals, or a combination thereof;
receiving, from the user device, a request, wherein the request comprises a location and one or more product preferences, and wherein at least one of the one or more product preferences comprises a project budget or a cost offset;
determining site specific information based at least in part on the request, the site specific information comprising one or more of geospatial data, weather data, site measurement data, and solar irradiance data;
identifying one or more products for recommendation based on the site specific information;
displaying at least one of a product recommendation, a quote, and a sales proposal for at least one product of the one or more products via the first virtual storefront UI accessed from the user device;
obtaining one or more first performance results, the one or more first performance results specific to the first virtual storefront template;
generating the at least one of the product recommendation, the quote, and the sales proposal for the at least one product based at least in part on identifying the one or more products, and wherein identifying the one or more products is based at least in part on identifying one or more preferences specified by the contractor, product options, pricing data for the product options, information pertaining to one or more projects at or near the location, demographic data for the user, and behavioral data for the user;
applying at least one of a machine learning model or a logic based model to determine an accuracy level for the one or more products for recommendation based on one or more of input data quality, wherein the input data quality is based in part on one or more of the site specific information, the contractor specified preferences, and the information pertaining to the one or more projects at or near the location; and
wherein generating and displaying the quote for the at least one product is based on a respective accuracy level for the at least one product exceeding a threshold accuracy level for the product recommendation.

16. The method of claim 15, further comprising:
receiving, from the administrator device, a second set of inputs;

generating a second virtual storefront template based at least in part on the second set of inputs;
obtaining one or more second performance results specific to the second virtual storefront template; and
comparing the one or more second performance results to the one or more first performance results to determine an optimal virtual storefront template between the first and the second virtual storefront templates for one or more input factors, the one or more input factors including at least the location.

17. The method of claim 16, wherein generating the second virtual storefront template comprises modifying at least a portion of the first virtual storefront template by applying the second set of inputs to the first virtual storefront template, and wherein modifying the at least the portion of the first virtual storefront template comprises at least one of: displaying different data, utilizing different inputs to model prices, and utilizing a different format for presenting data, and wherein the second virtual storefront template is used to generate a second virtual storefront UI.

18. A non-transitory computer-readable storage medium having instructions embodied thereon, the instructions being executable by one or more processors to perform a method for generating and optimizing virtual storefront templates, the method comprising:
receive, using an interface provided on an administrator device, a first set of inputs, wherein the administrator device is associated with a contractor and access a virtual store front module hosted on a virtual storefront server using one or more integrated application programming interfaces (API) configured to make calls to the virtual storefront module;
generate a first virtual storefront template based at least in part on the first set of inputs;
access, from a user device, a first virtual storefront user interface (UI) generated from the first virtual storefront template, the first virtual storefront template UI generated by populating one or more fields of the virtual storefront template in response to one or more calls by the one or more API to the virtual storefront server, wherein the first virtual storefront UI is capable of being accessed to obtain product recommendations, quotes, sales proposals, or a combination thereof;
receive, from the user device, a request, wherein the request comprises a location and one or more product preferences, and wherein at least one of the one or more product preferences comprises a project budget or a cost offset;
determine site specific information based at least in part on the request, the site specific information comprising one or more of geospatial data, weather data, site measurement data, and solar irradiance data;
identify one or more products for recommendation based on the site specific information;
display at least one of a product recommendation, a quote, and a sales proposal for at least one product of the one or more products via the first virtual storefront UI accessed from the user device;
obtain one or more first performance results, the one or more first performance results specific to the first virtual storefront template;
generate the at least one of the product recommendation, the quote, and the sales proposal for the at least one product based at least in part on identifying the one or more products, and wherein identifying the one or more products is based at least in part on identifying one or more preferences specified by the contractor, product options, pricing data for the product options, information pertaining to one or more projects at or near the location, demographic data for the user, and behavioral data for the user;
apply at least one of a machine learning model or a logic based model to determine an accuracy level for the one or more products for recommendation based on one or more of input data quality, wherein the input data quality is based in part on one or more of the site specific information, the contractor specified preferences, and the information pertaining to the one or more projects at or near the location; and
wherein generating and displaying the quote for the at least one product is based on a respective accuracy level for the at least one product exceeding a threshold accuracy level for the product recommendation.

* * * * *